US012437704B2

(12) United States Patent
Li

(10) Patent No.: US 12,437,704 B2
(45) Date of Patent: Oct. 7, 2025

(54) DISPLAY PANEL, METHOD FOR DRIVING THE SAME, AND DISPLAY DEVICE

(71) Applicant: WUHAN TIANMA MICRO-ELECTRONICS CO., LTD., Wuhan (CN)

(72) Inventor: Rui Li, Wuhan (CN)

(73) Assignee: WuHan TianMa Micro-electronics Co., Ltd., Wuhan (CN)

( * ) Notice: Subject to any disclaimer, the term of this patent is extended or adjusted under 35 U.S.C. 154(b) by 134 days.

(21) Appl. No.: 18/358,327

(22) Filed: Jul. 25, 2023

(65) Prior Publication Data

US 2024/0021149 A1 Jan. 18, 2024

(30) Foreign Application Priority Data

May 16, 2023 (CN) ......................... 202310550277.0

(51) Int. Cl.
*G09G 3/32* (2016.01)

(52) U.S. Cl.
CPC ....... *G09G 3/32* (2013.01); *G09G 2300/0452* (2013.01); *G09G 2300/0842* (2013.01); *G09G 2300/0861* (2013.01); *G09G 2310/08* (2013.01); *G09G 2320/0242* (2013.01)

(58) Field of Classification Search
CPC ...... G09G 3/32; G09G 3/3233; G09G 3/3266; G09G 3/3275; G09G 2300/0452; G09G 2300/0842; G09G 2300/0861; G09G 2310/08; G09G 2320/0242
See application file for complete search history.

(56) References Cited

U.S. PATENT DOCUMENTS

2022/0335894 A1* 10/2022 Zhou .................... G09G 3/3266

FOREIGN PATENT DOCUMENTS

| | | |
|---|---|---|
| CN | 110223633 B | 9/2021 |
| CN | 114743507 A | 7/2022 |
| CN | 115909944 A | 4/2023 |

OTHER PUBLICATIONS

Office Action mailed Jun. 23, 2025, issued in corresponding Chinese Application No. 202310550277.0, filed May 16, 2023, 20 pages.

* cited by examiner

*Primary Examiner* — Michael A Faragalla
(74) *Attorney, Agent, or Firm* — CHRISTENSEN O'CONNOR JOHNSON KINDNESS PLLC

(57) ABSTRACT

A display panel including sub-pixels each including a pixel circuit and a light-emitting element. The pixel circuit includes a plurality of anode reset circuits. The sub-pixels include a red sub-pixel, a green sub-pixel, and a blue sub-pixel. Anode reset circuits in the red sub-pixel and the blue sub-pixel are configured to respectively reset anodes of the light-emitting elements in the red sub-pixel and the blue sub-pixel by using a first anode reset voltage. The anode reset circuit of the green sub-pixel is configured to reset an anode of the light-emitting element of the green sub-pixel by using a second anode reset voltage greater than the first anode reset voltage.

40 Claims, 19 Drawing Sheets

DISPLAY PANEL, METHOD FOR DRIVING THE SAME, AND DISPLAY DEVICE

CROSS-REFERENCE TO RELATED APPLICATIONS

The present application claims priority to Chinese Patent Application No. 202310550277.0, filed on May 16, 2023, the content of which is incorporated herein by reference in its entirety.

TECHNICAL FIELD

The present disclosure relates to the technical field of display, and in particular, to a display panel, a method for driving a display panel, and a display device.

BACKGROUND

Dark mode is a display mode in which a dark background cooperates with light-color to display contents such as text, etc. This mode can meet deeper requirements for reading comfort and legibility.

However, at present, in the dark mode, when a user's finger drags a light-colored display content to change its position on the screen, color cast occurs, which affects user's experience.

SUMMARY

In a first aspect, the present disclosure provides a display panel. The display panel includes: a plurality of sub-pixels each including a pixel circuit and a light-emitting element. The pixel circuit includes an anode reset circuit. The plurality of sub-pixels includes a red sub-pixel, a green sub-pixel, and a blue sub-pixel. The anode reset circuit of the red sub-pixel is configured to reset an anode of the light-emitting element of the red sub-pixel by using a first anode reset voltage. The anode reset circuit of the blue sub-pixel is configured to reset an anode of the light-emitting element of the blue sub-pixel by using the first anode reset voltage. The anode reset circuit of the green sub-pixel is configured to reset an anode of the light-emitting element of the green sub-pixel by using a second anode reset voltage. The second anode reset voltage is greater than the first anode reset voltage pixel circuit.

In a second aspect, the present disclosure provides a method for driving a display panel of the first aspect. The method includes: controlling the anode reset circuits in the red sub-pixel and the blue sub-pixel to reset the anodes of the light-emitting elements in the red sub-pixel and the blue sub-pixel by using a first anode reset voltage; and controlling the anode reset circuit of the green sub-pixel to reset the anode of the light-emitting element of the green sub-pixel by using the second anode reset voltage greater than the first anode reset voltage.

In a third aspect, the present disclosure provides a display device. The display device includes a display panel of the first aspect.

BRIEF DESCRIPTION OF DRAWINGS

In order to more clearly illustrate the technical solutions in the embodiments of the present disclosure, the accompanying drawings used in the description of the embodiments will be briefly introduced below. The accompanying drawings in the following description are only some embodiments of the present disclosure, and other drawings can be obtained by those of ordinary skill in the art from the provided drawings.

DESCRIPTION OF EMBODIMENTS

Figure 1:
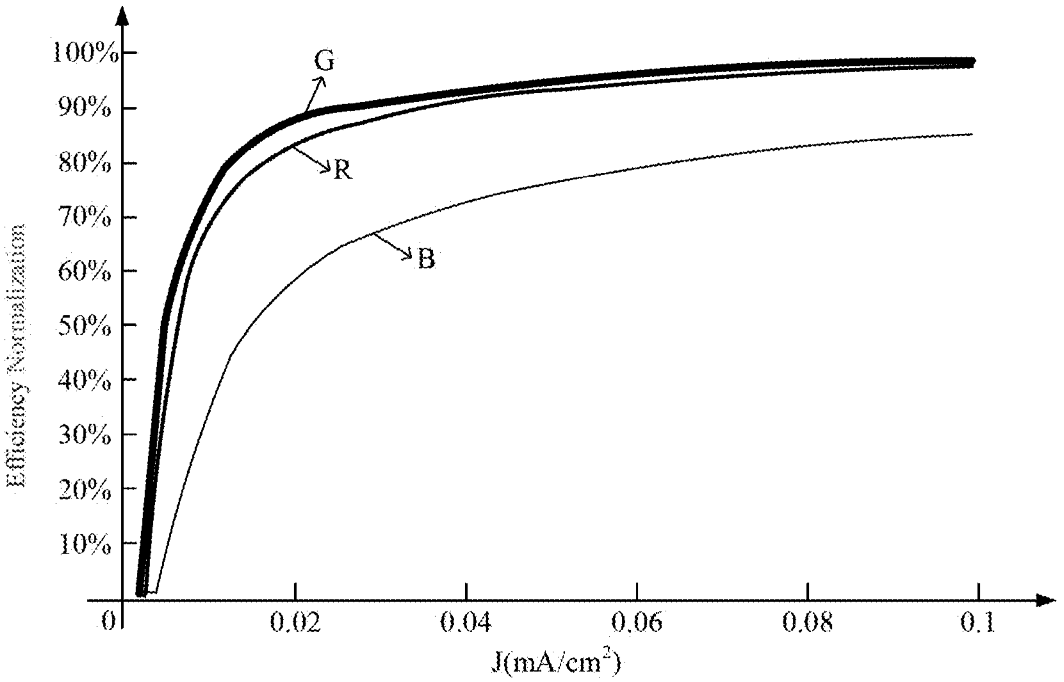
FIG. 1 is a graph showing efficiency curves of a red sub-pixel, a green sub-pixel, and a blue sub-pixel according to some embodiments of the present disclosure.

For facilitating the understanding of the technical solution of the present disclosure, the embodiments of the present disclosure are described in detail below.

The described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there can be three relationships, for example, A and/or B can indicate that three cases, i.e., A alone, A and B, B alone. In addition, the character "/" herein generally indicates that the related objects before and after the character are in an "or" relationship.

As stated in the Background, in the dark mode, light-colored display contents are displayed with a dark background. In the dark mode, as the user's finger slides across the screen, the position of the light-colored display content on the screen is changed accordingly. For example, when the user drags the light-colored display content from a first position to a second position on the screen, the content displayed at the second position is switched from the dark background to the light-colored text, that is, a black image is switched to a white image.

The color of the display image at different positions of the display panel is presented by pixel points at this position, and the color of pixel points is determined by the brightness of a red sub-pixel, a green sub-pixel, and a blue sub-pixel included in the pixel points under respective corresponding currents.

Before the sliding of the finger, the second position displays a black image. For example, the red sub-pixel, the green sub-pixel and the blue sub-pixel in one pixel at the second position all display with the brightness corresponding to greyscale 0. After the sliding of the finger, the second position displays a white image. For example, the red sub-pixel, the green sub-pixel and the blue sub-pixel in the pixel points display with the brightness corresponding to greyscale 255.

There is a charging process when the sub-pixel receives a current and emits light, so that the sub-pixel may not be instantly switched from the dark state (the brightness corresponding to the greyscale 0) to the bright state (the brightness corresponding to the greyscale 255). The brightness of the sub-pixel is progressively increased over time. For this reason, in this process, the brightness of a first frame is smaller than the brightness of a second frame and subsequent frames. For example, the current I1 in the first frame and the current I2 in the second frame and subsequent frames satisfy: I1<I2.

Affected by different properties of materials of sub-pixels of different colors, the sub-pixels of different colors have different change degree of the light-emitting efficiency under the change of unit current density. This is because. FIG. 1 is a graph showing efficiency curves of a red sub-pixel, a green sub-pixel, and a blue sub-pixel according to some embodiments of the present disclosure. As shown in FIG. 1, under a same current change ΔI(I2−I1), the efficiency changing degree of the green sub-pixel is greater than that if the blue and red sub-pixels. As a result, the brightness of the green sub-pixel at the start time (the charging of the green sub-pixel begins) of the first frame is decreased by a larger amount with respect to the second frame. As a result, the brightness proportion of the red, blue and green sub-pixels in the first frame deviates from the target brightness proportion, and a white balance may not be achieved. In addition, the green light contributes more to the brightness of the pixel including the green sub-pixel, so a reddish problem occurs during the dragging operation in the dark mode.

Figure 2:
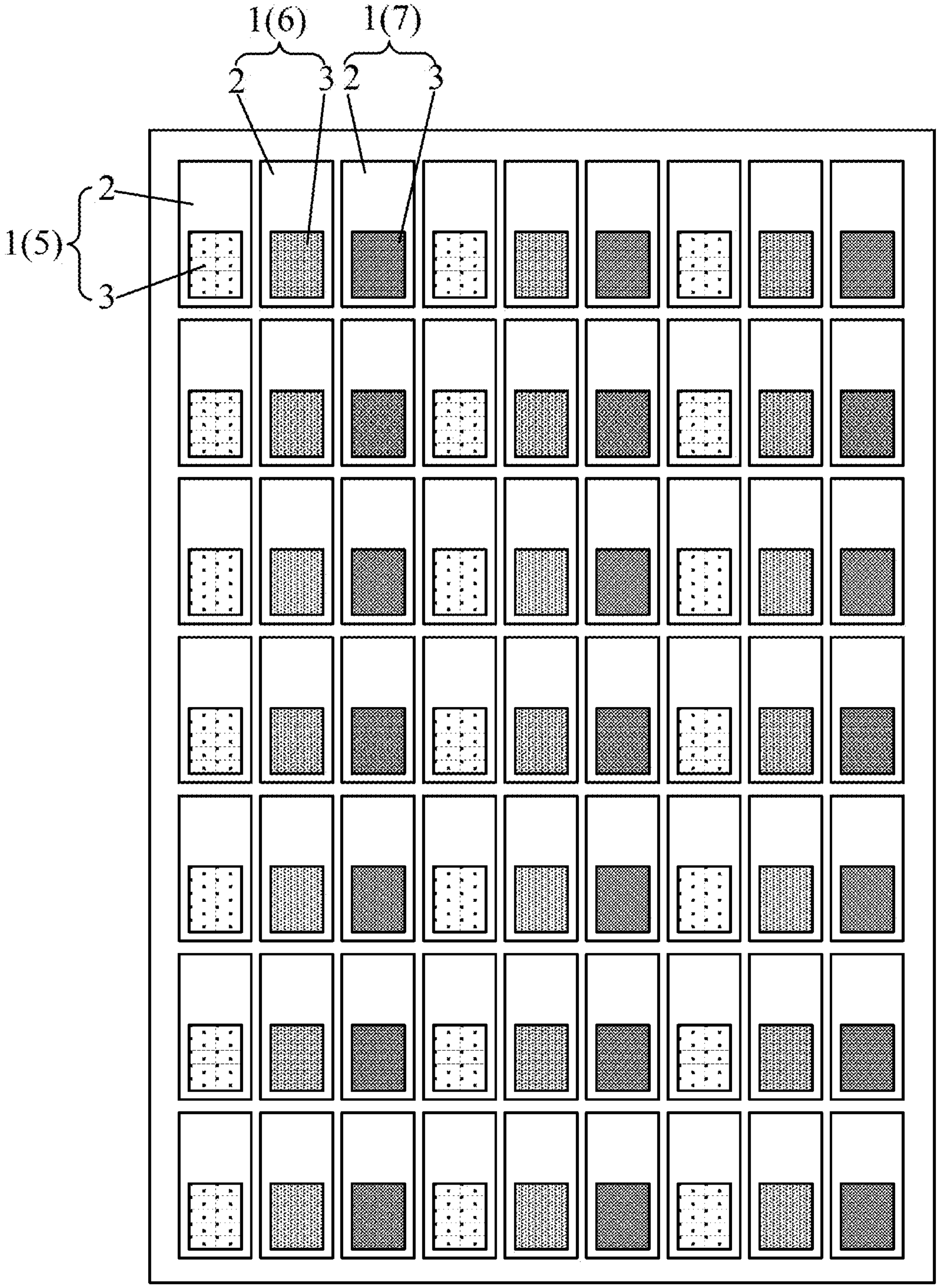
FIG. 2 is a structural schematic diagram of a display panel according to some embodiments of the present disclosure.
Figure 3:
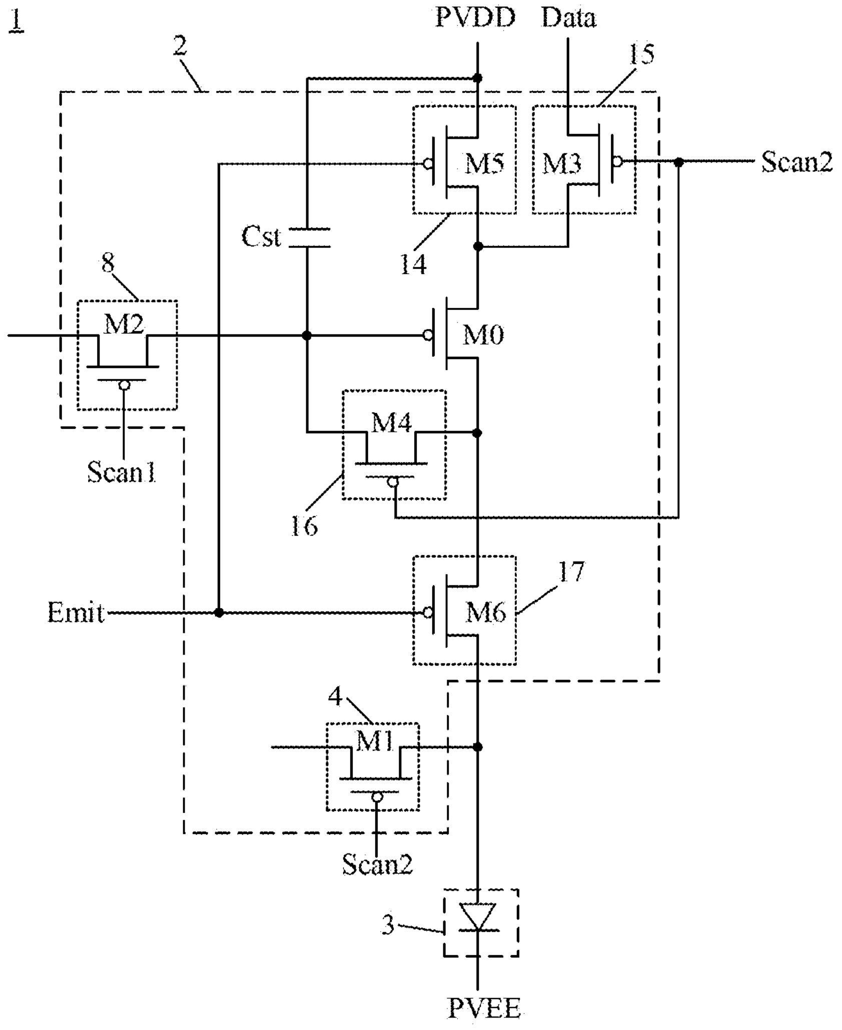
FIG. 3 is a structural schematic diagram of a sub-pixel according to some embodiments of the present disclosure.
Figure 4:
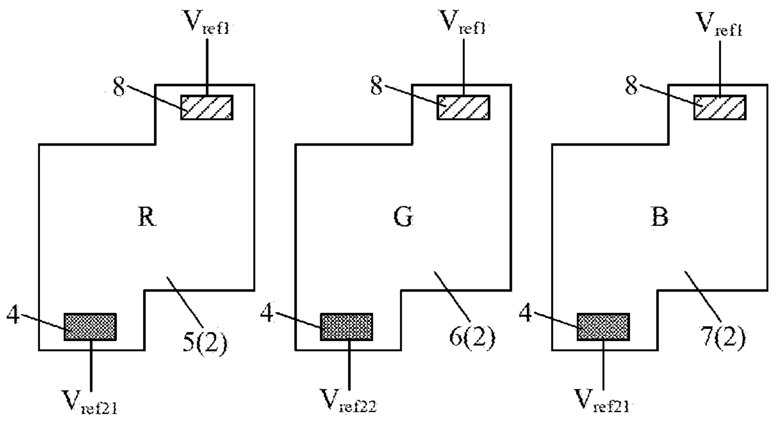
FIG. 4 is a structural schematic diagram of a red sub-pixel, a green sub-pixel, and a blue sub-pixel according to some embodiments of the present disclosure.

Embodiments of the present disclosure provide a display panel capable of alleviating the above problem. FIG. 2 is a structural schematic diagram of a display panel according to some embodiments of the present disclosure. FIG. 3 is a structural schematic diagram of a sub-pixel 1 according to some embodiments of the present disclosure. FIG. 4 is a structural schematic diagram of a red sub-pixel 5, a green sub-pixel 6, and a blue sub-pixel 7 according to some embodiments of the present disclosure. As shown in FIG. 2 to FIG. 4, the display panel includes sub-pixels 1, and the sub-pixel 1 includes a pixel circuit 2 and a light-emitting element 3. The pixel circuit 2 includes an anode reset circuit 4.

The sub-pixels 1 includes red sub-pixels 5, green sub-pixels 6 and blue sub-pixels 7. The anode reset circuit 4 of the red sub-pixel 5 resets an anode of the light-emitting element 3 of the red sub-pixel 5 by using a first anode reset voltage $V_{ref21}$, and the anode reset circuit 4 of the blue sub-pixel 7 resets an anode of the light-emitting element 3 of the blue sub-pixel 7 also by using the first anode reset voltage $V_{ref21}$. The anode reset circuit 4 of the green sub-pixel 6 resets an anode of the light-emitting element 3 of the green sub-pixel 6 by using a second anode reset voltage $V_{ref22}$, and the second anode reset voltage $V_{ref22}$ is greater than the first anode reset voltage $V_{ref21}$.

As shown in FIG. 3, during the operation of the pixel circuit 2, the anode reset circuit 4 supplies an anode reset voltage to the anode of the light-emitting element 3, so that the voltage of the anode of the light-emitting element 3 is initialized. Next, a driving current is supplied to the anode of the light-emitting element 3 through a second light-emitting control circuit 17 so as to charge the light-emitting element 3. When the anode of the light-emitting element 3 is charged to a turn-on voltage, the light-emitting element 3 begins to emit light.

In some embodiments of the present disclosure, the anode reset voltage received by the anode reset circuit 4 in the green sub-pixel 6 is designed to be different from the anode reset voltages received by the anode reset circuits 4 in the red sub-pixel 5 and the blue sub-pixel 7, so that the light-emitting durations of the light-emitting elements 3 in the red, green and blue sub-pixels 1 can be adjusted. In some embodiments of the present disclosure, the second anode reset voltage $V_{ref22}$ received by the anode reset circuit 4 in the green sub-pixel 6 is increased, and thus the anode voltage of the light-emitting element 3 in the green sub-pixel 6 is increased after being reset. Accordingly, when the pixel circuit 2 supplies the driving current to the anode of the light-emitting element 3, the charging of the anode of the light-emitting element 3 begins at an increased potential, and thus the duration for charging the anode to the turn-on voltage is effectively reduced. As a result, the light-emitting element 3 in the green sub-pixel 6 begins to emit light at an earlier time, and the light-emitting duration of the green sub-pixel 6 is increased, effectively increasing the brightness of the green sub-pixel 6. With the brightness of the green sub-pixel 6 in the first frame being increased, the brightness proportion of the red sub-pixel 5, the green sub-pixel 6 and the blue sub-pixel 7 in the first frame can be adjusted. In this way, the brightness proportion of the red, green and blue sub-pixels in the first frame close to the brightness proportion in other subsequent frames, and the white balance of the first frame can be achieved, thereby effectively solving the reddish problem during the dragging operation in the first frame in the dark mode.

Different light emitting materials have different light-emitting efficiencies. In some embodiments of the present disclosure, the deviation of the brightness proportion of the red sub-pixel 5, the green sub-pixel 6 and the blue sub-pixel 7 in the first frame is determined according to the actual light-emitting efficiencies of the red sub-pixel 5, the green sub-pixel 6 and the blue sub-pixel 7 of the display panel. Next, the difference between the first anode reset voltage $V_{ref21}$ and the second anode reset voltage $V_{ref22}$ is designed according to the deviation. Based on the current material system, every 0.1V raised by the second anode reset voltage $V_{ref22}$, the brightness of the green sub-pixel 6 in the first frame will be increased by 10-12%.

In some embodiments of the present disclosure, as shown in FIG. 3 and FIG. 4, the pixel circuit 2 further includes a driving transistor M0 and a gate reset circuit 8. The gate reset circuits 8 in the red sub-pixel 5, the green sub-pixel 6 and the blue sub-pixel 7 reset the gates of the driving transistors M0 in the red sub-pixel 5, the green sub-pixel 6 and the blue sub-pixel 7 by using the same gate reset voltage $V_{ref1}$. That is, the gate reset circuits 8 in the red sub-pixel 5, the green sub-pixel 6 and the blue sub-pixel 7 receive the same gate reset voltage $V_{ref1}$.

As shown in FIG. 3, during the operation process of the pixel circuit 2, the gate reset circuit 8 supplies the gate rest voltage to the gate of the driving transistor M0 so as to initialize the gate of the driving transistor M0. Next, the gate of the driving transistor M0 is charged through a data writing circuit 15 and a compensation circuit 16, and the conduction condition of the driving transistor M0 is regulated, so that the driving transistor M0 generates the current matched with the data voltage. The current is supplied to the anode of the light-emitting element 3 through the first light-emitting control circuit 14.

In some embodiments of the present disclosure, the gate reset circuits 8 in the red sub-pixel 5, the green sub-pixel 6 and the blue sub-pixel 7 are designed to receive the same gate reset voltage, rather than different gate reset voltages. In this way, the driving transistors M0 in different sub-pixels 1 are reset to the same level, and thus the charging uniformity of the driving transistors M0 in different sub-pixels 1 is improved in the subsequent process of charging the driving transistors M0 in the sub-pixels 1.

In some embodiments, the gate reset voltage $V_{ref1}$ is equal to the first anode reset voltage $V_{ref21}$ or the second anode reset voltage $V_{ref22}$.

In a conventional design of the structure of the display panel, the anode reset circuit 4 and the gate reset circuit 8 in the pixel circuit 2 receive the same reset voltage. Therefore, the anode reset circuits 4 and the gate reset circuits 8 of the same pixel row can be connected to the same reset line.

In some embodiments of the present disclosure, the anode reset circuits 4 in different color sub-pixels 1 are designed to receive different anode reset voltages, so the reset line connected to the anode reset circuit 4 in the green sub-pixel 6 is different from the reset line connected to the anode reset circuits 4 in the red sub-pixel 5 and the blue sub-pixel 7. Based on this, the gate reset voltage $V_{ref1}$ is designed to be equal to the first anode reset voltage $V_{ref21}$ or the second anode reset voltage $V_{ref22}$, thereby reducing the change to the existing reset line. For example, when the gate reset voltage $V_{ref1}$ is equal to the first anode reset voltage $V_{ref21}$, in one pixel row, the anode reset circuit 4 and the gate reset circuit 8 in the red sub-pixel 5, the anode reset circuit 4 and the gate reset circuit 8 in the blue sub-pixel 7, and the gate reset circuit 8 in the green sub-pixel 6 can be connected to the same reset line, while the anode reset circuit 4 in the green sub-pixel 6 can be connected to another reset line.

In some embodiments of the present disclosure, the gate reset voltage $V_{ref1}$ is not equal to either the first anode reset voltage $V_{ref21}$ or the second anode reset voltage $V_{ref22}$.

With such an arrangement, the gate reset voltage $V_{ref1}$, the first anode reset voltage $V_{ref21}$ and the second anode reset voltage $V_{ref22}$ are independent from each other. The gate reset voltage $V_{ref1}$, the first anode reset voltage $V_{ref21}$ and the second anode reset voltage $V_{ref22}$ are controlled more flexibly according to different resetting requirements of the driving transistor M0 and the light-emitting element 3. For example, when the driving transistor M0 requires a small gate reset voltage $V_{ref1}$, it just needs to lower the gate reset voltage $V_{ref1}$ without affecting the first anode reset voltage $V_{ref21}$ and the second anode reset voltage $V_{ref22}$.

Further, when the gate reset voltage $V_{ref1}$, the first anode reset voltage $V_{ref21}$ and the second anode reset voltage $V_{ref22}$ are different from each other, the gate reset voltage $V_{ref1}$ is set smaller than the first anode reset voltage $V_{ref21}$, so that the gate reset voltage $V_{ref1}$ is lower, and the driving transistor M0 is reset more sufficiently.

In some embodiments of the present disclosure, the gate reset voltage $V_{ref1}$ is between the first anode reset voltage $V_{ref21}$ and the second anode reset voltage $V_{ref22}$, or the gate reset voltage $V_{ref1}$ is greater than the second anode reset voltage $V_{ref22}$.

Figure 5:
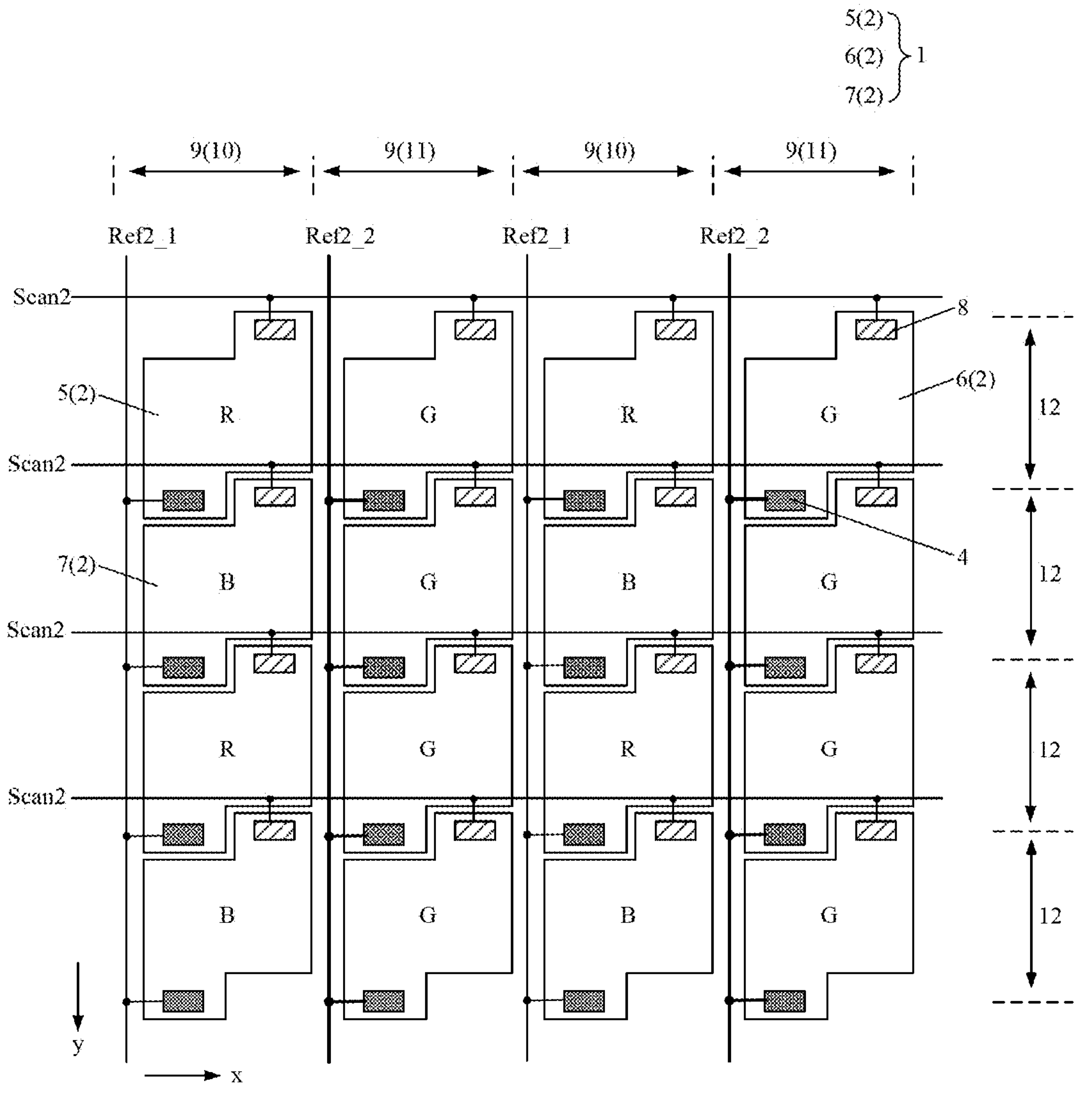
FIG. 5 is a partial diagram of a display panel according to some embodiments of the present disclosure.
Figure 6:
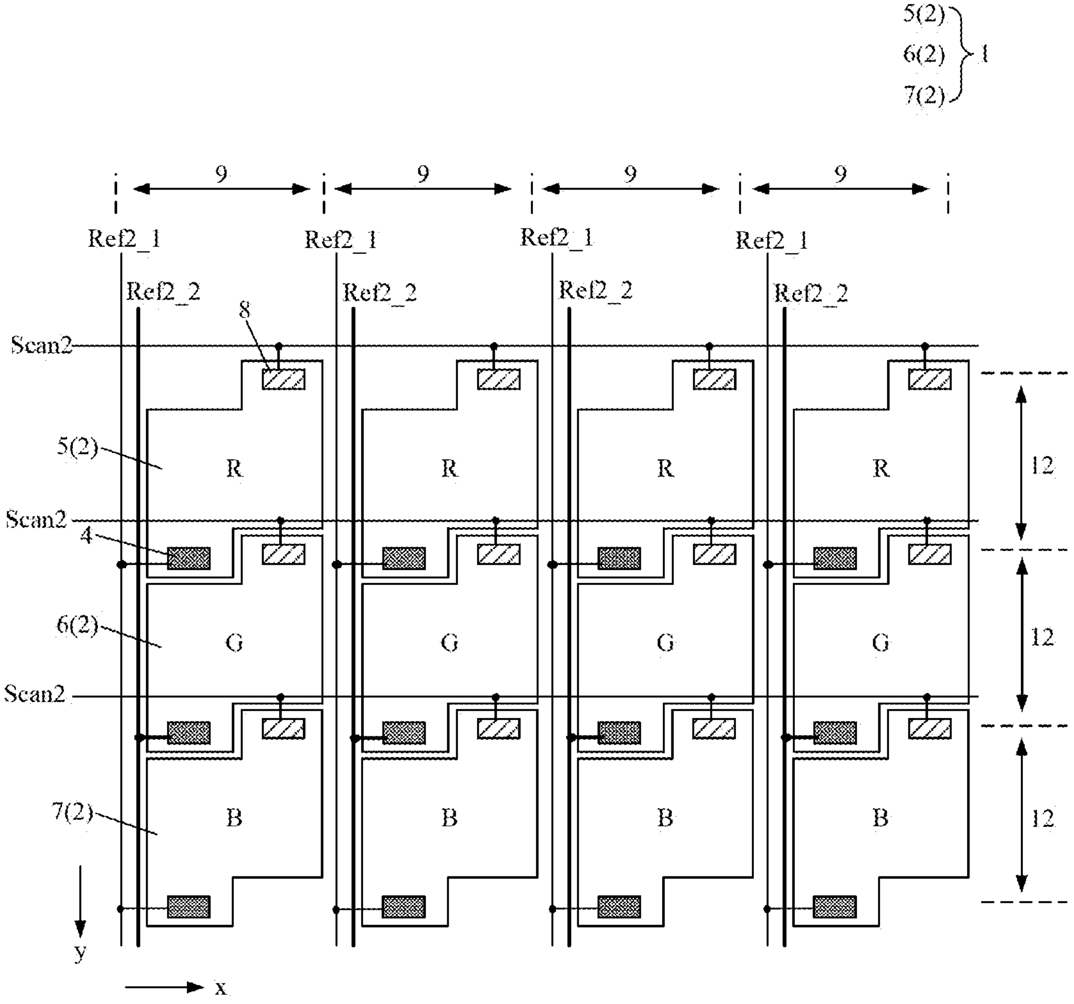
FIG. 6 is a partial diagram of a display panel according to some embodiments of the present disclosure.

FIG. 5 is a partial diagram of a display panel according to some embodiments of the present disclosure. FIG. 6 is a partial diagram of a display panel according to some embodiments of the present disclosure. In some embodiments of the present disclosure, as shown in FIG. 5 and FIG. 6, the display panel further includes multiple pixel columns 9 arranged along a first direction x, and the pixel column 9 includes multiple sub-pixels 1 arranged along a second direction y. The first direction x crosses the second direction y.

The display panel further includes first anode reset lines Ref2_1 and second anode reset lines Ref2_2. The first anode reset line Ref2_1 extends along the second direction y. The first anode reset line Ref2_1 is electrically connected to the anode reset circuits 4 in the red sub-pixels 5 and the blue sub-pixels 7 in the corresponding pixel column 9. The second anode reset line Ref2_2 extends along the second direction y. The second anode reset line Ref2_2 is electrically connected to the anode reset circuits 4 in the green sub-pixels 6 in the corresponding pixel column 9.

As shown in FIG. 3, FIG. 5, and FIG. 6, the display panel further includes multiple pixel rows 12 arranged along the second direction y. The pixel row 9 includes multiple sub-pixels 1 arranged along the first direction x. The anode reset circuit 4 is electrically connected to a second scan signal line Scan2. The second scan signal line Scan2 extends along the first direction x and is electrically connected to the anode reset circuits 4 in the pixel row 12. When the second scan signal line Scan2 supplies an active level, the anode reset circuits 4 connected to the second scan signal line Scan2 are turned on, and the first anode reset voltage $V_{ref21}$ or the second anode reset voltage $V_{ref22}$ is transmitted to the light-emitting elements 3 connected to the anode reset circuits 4.

In the above arrangement, the extending direction of the first anode reset line Ref2_1 and the second anode reset line Ref2_2 crosses the extending direction of the second scan signal line Scan2. Therefore, when one pixel row 12 is scanned by the second scan signal line Scan2, the anode reset circuits 4 in all red sub-pixels Sand/or the anode reset circuits 4 in all blue sub-pixels 7 in this pixel row 12 receive the first anode reset voltages $V_{ref21}$ that are transmitted a same distance on the first anode reset lines Ref2_1. These first anode reset voltages $V_{ref21}$ are all transmitted from the bottom of the display region to this pixel row 12. Moreover, the anode reset circuits 4 in all green sub-pixels 6 in this pixel row 12 receive the second anode reset voltage $V_{ref22}$ that are transmitted a same distance on the second anode reset lines Ref2_2. These second anode reset voltages $V_{ref22}$ are all transmitted from the bottom of the display region to this pixel row 12. In this way, the first anode reset voltages $V_{ref21}$ received by the red sub-pixels 5 and the blue sub-pixels 7 in the pixel row 12 have the same voltage drop, so the resetting uniformity of the light-emitting elements 3 in these red sub-pixels 5 and blue sub-pixels 7 is improved. The second anode reset voltages $V_{ref22}$ received by the green sub-pixels 6 have the same voltage drop, so the resetting uniformity of the light-emitting elements 3 in these green sub-pixels 6 is improved.

In other words, this arrangement can overcome the non-uniform voltage drops of the anode reset voltages received by the same color sub-pixels 1 arranged laterally and is especially suitable for high-frequency driving display panels and display panels with high pixel density and has better improvement effect on these display panels.

Further, as shown in FIG. 5, the pixel columns 9 include: first pixel columns 10 and second pixel columns 11 alternately arranged along the first direction x. The first pixel column 10 includes red sub-pixels 5 and blue sub-pixels 7 alternately arranged along the second direction y. The second pixel column 11 includes multiple green sub-pixels 6 arranged along the second direction y.

One first anode reset line Ref2_1 corresponds to one first pixel column 10 and is electrically connected to the anode reset circuits 4 in the one first pixel column 10. One second anode reset line Ref2_2 corresponds to one second pixel column 11 and is connected to the anode reset circuits 4 in the one second pixel column 11.

When the first anode reset line Ref2_1 and the second anode reset line Ref2_2 extend along the second direction y, the sub-pixels 1 are arranged in the following manner. The red sub-pixels 5 and the blue sub-pixels 7 are arranged in the first pixel columns 10, and the green sub-pixels 6 are arranged in the second pixel columns 11. The pixel column 9 is provided with only one first anode reset line Ref2_1 or only one second anode reset line Ref2_2, so that the number of the reset lines extending longitudinally in the display panel is reduced, thereby optimizing the wiring arrangement.

Figure 7:
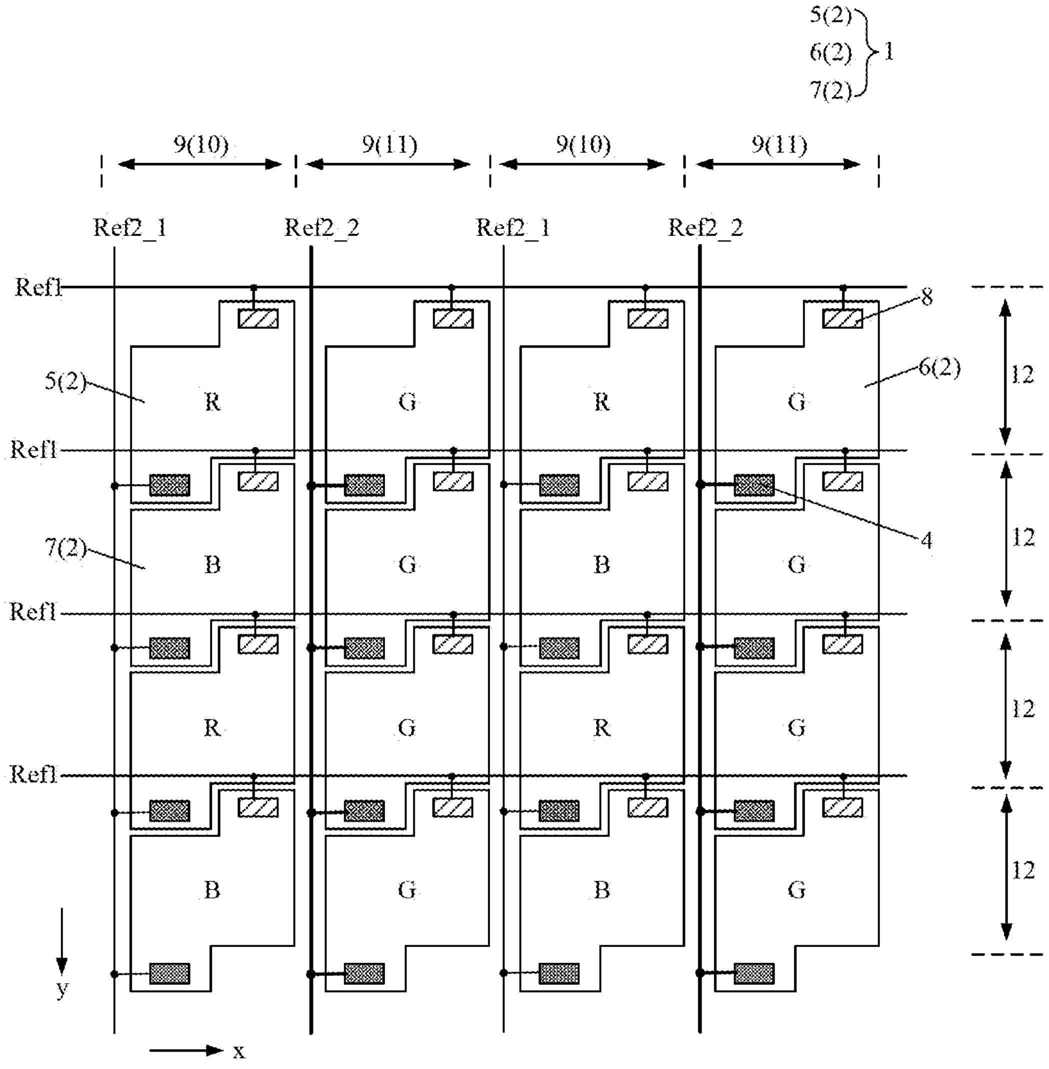
FIG. 7 is a partial diagram of a display panel according to some embodiments of the present disclosure.
Figure 8:
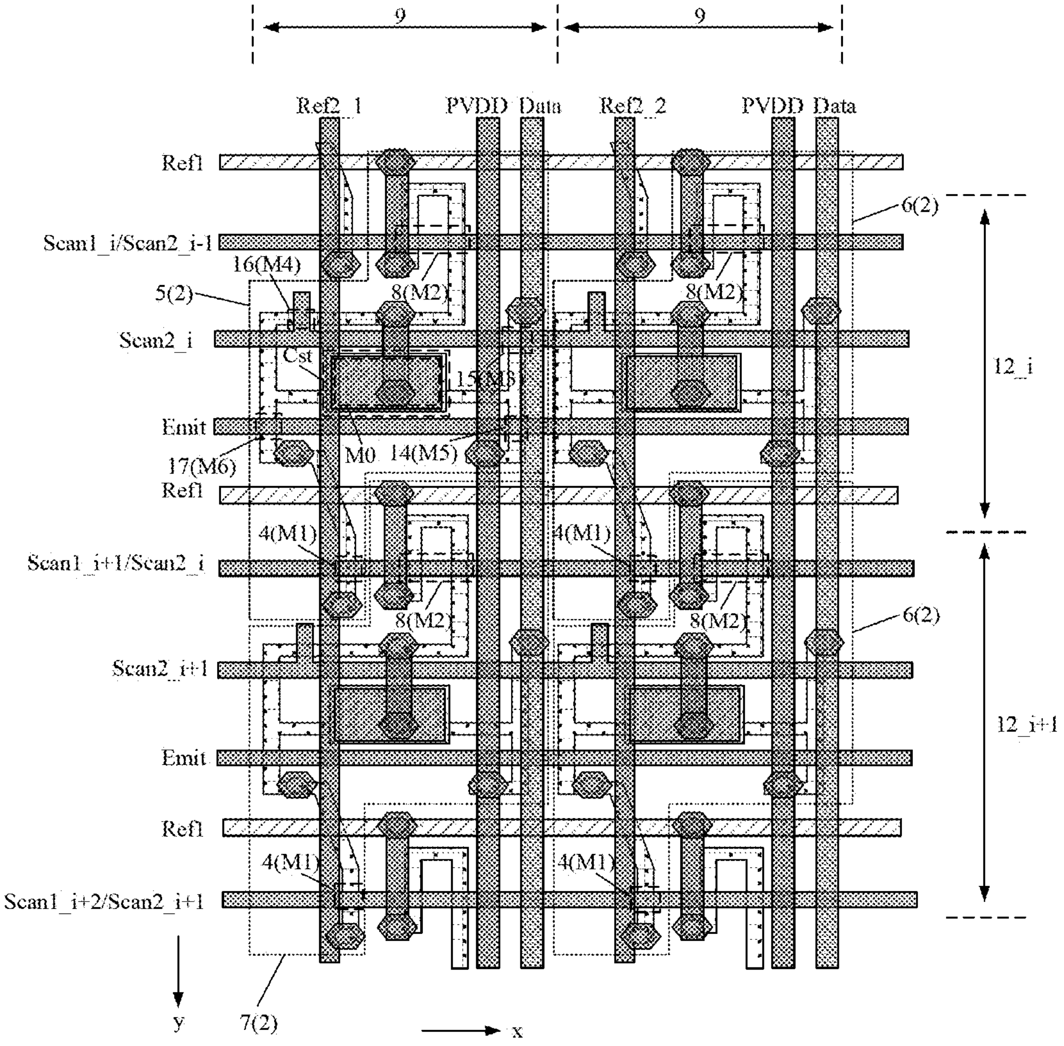
FIG. 8 is a partial diagram showing layers of a display panel according to some embodiments of the present disclosure.

FIG. 7 is a partial diagram of a display panel according to some embodiments of the present disclosure. FIG. 8 is a partial diagram showing layers of a display panel according to some embodiments of the present disclosure. In some embodiments of the present disclosure, as shown in FIG. 7 and FIG. 8, the display panel further includes multiple pixel rows 12 arranged along the second direction y. The pixel row 12 includes multiple sub-pixels 11 arranged along the first direction x. The display panel further includes gate reset lines Ref1 extending along the first direction x. The gate reset line Ref1 is electrically connected to the gate reset circuits 8 in the sub-pixels 1 in one pixel row 12.

As stated above, the first anode reset line Ref2_1 and the second anode reset line Ref2_2 can extend longitudinally along the second direction y. If the gate reset line Ref1 is also designed to extend longitudinally, the number of lines extending longitudinally is too large. In order to simplify the layout of the reset lines extending longitudinally, the gate reset line Ref1 is designed to extend laterally along the first direction x in embodiments of the present disclosure.

As shown in FIG. 8, in some embodiments of the present disclosure, the pixel row 12 can correspond to one first scan signal line Scan1 and one second scan signal line Scan2. For the $i^{th}$ pixel row 12_*i* and the (i+1)th pixel row 12_*i*+1 that are adjacent to each other, the second scan signal received by the $i^{th}$ pixel row 12_*i* and the first scan signal received by the (i+1)th pixel row 12_*i*+1 are the same. That is, the second scan signal line Scan2_*i* corresponding to the i_pixel row 12_*i* and the first scan signal line Scan1_*i*+1 corresponding to the (i+1)th pixel row 12_*i*+1 supply the same signal. As a result, in the layout design, the anode reset circuits 4 in the $i^{th}$ pixel row 12_*i* are exemplarily connected to the first scan signal line Scan1_*i*+1 corresponding to the (i+1)th pixel row 12_*i*+1. However, the anode reset circuits 4 in the $i^{th}$ pixel row 12_*i* can still be regarded as electrically connected to the second scan signal line Scan2_*i* corresponding to the $i^{th}$ pixel row 12_*i*.

Figure 9:
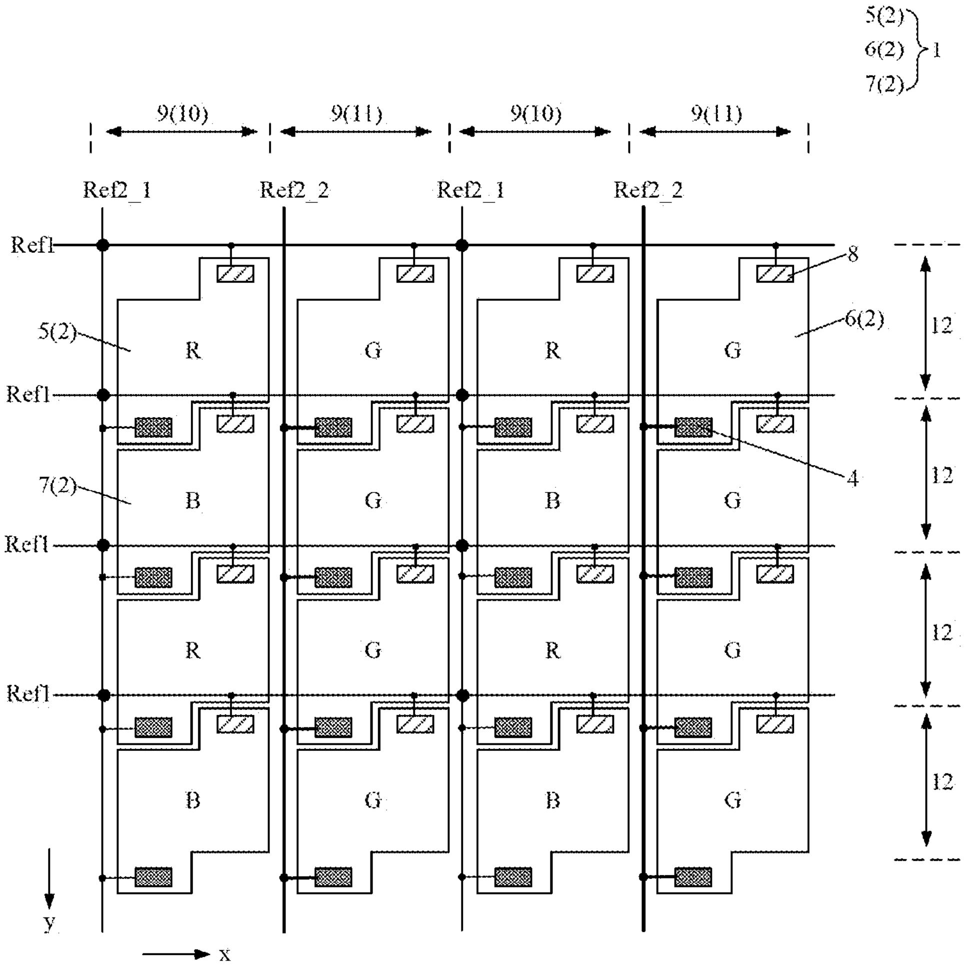
FIG. 9 is a partial diagram of a display panel according to some embodiments of the present disclosure.

FIG. 9 is a partial diagram of a display panel according to some embodiments of the present disclosure. Further, as shown in FIG. 9, the gate reset voltage $V_{ref1}$ is equal to the first anode reset voltage $V_{ref21}$, and the gate reset line Ref1 is connected to the first anode reset line Ref2_1. As a result, the gate reset lines Ref1 and the first anode reset lines Ref2_1 cross each other to form a grid structure, reducing the load of the overall wire constituted by the gate reset lines Ref1 and the first anode reset lines Ref2_1 and further reducing the voltage drop of the gate reset voltage $V_{ref1}$ (the first anode reset voltage $V_{ref21}$) when being transmitted on the wire.

Figure 10:
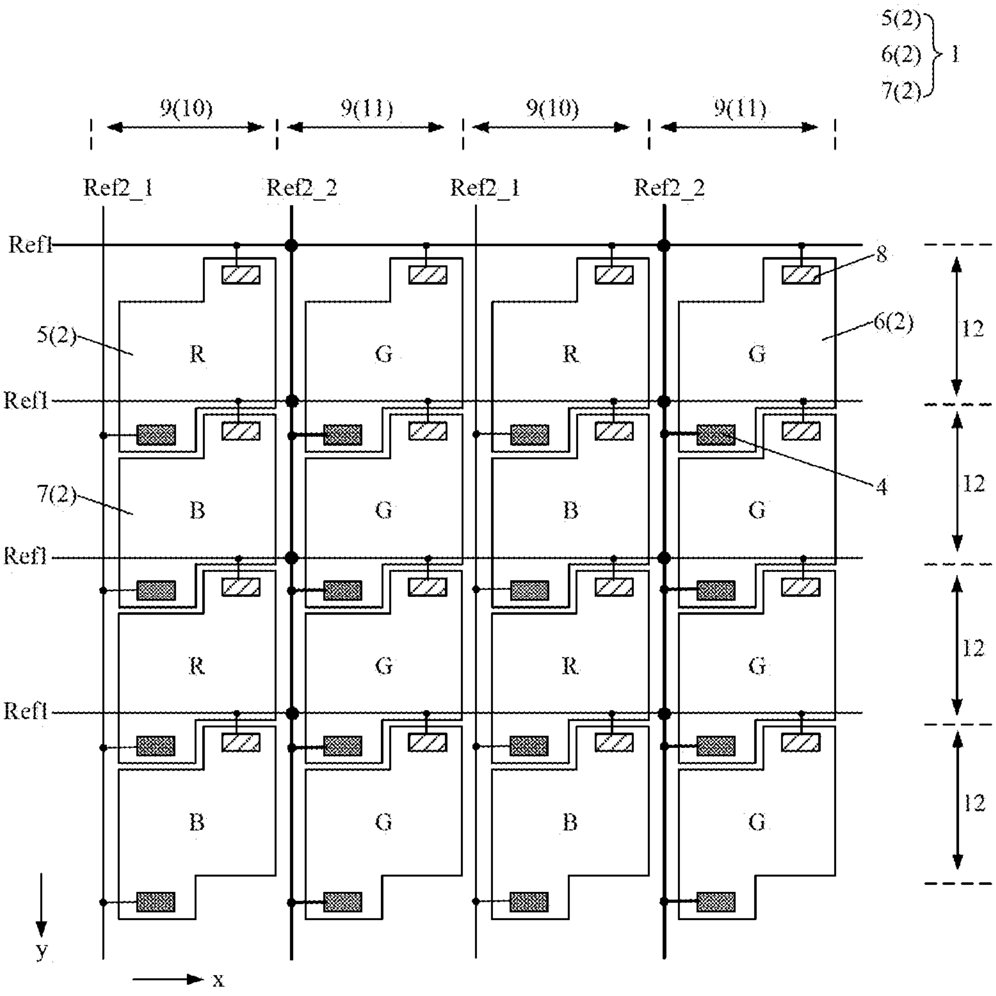
FIG. 10 is a partial diagram of a display panel according to some embodiments of the present disclosure.

FIG. 10 is a partial diagram of a display panel according to some embodiments of the present disclosure. In some embodiments of the present disclosure, as shown in FIG. 10, the gate reset voltage $V_{ref1}$ is equal to the second anode reset voltage $V_{ref22}$, and the gate reset line Ref1 is connected to the second anode reset line Ref2_2. As a result, the gate reset lines Ref1 and the second anode reset lines Ref2_2 cross each other to form a grid structure, reducing the load of the overall wire constituted by the gate reset lines Ref1 and the second anode reset lines Ref2_2 and further reducing the voltage drop of the gate reset voltage $V_{ref1}$ (the second anode reset voltage $V_{ref22}$) when being transmitted on the wire.

Figure 11:
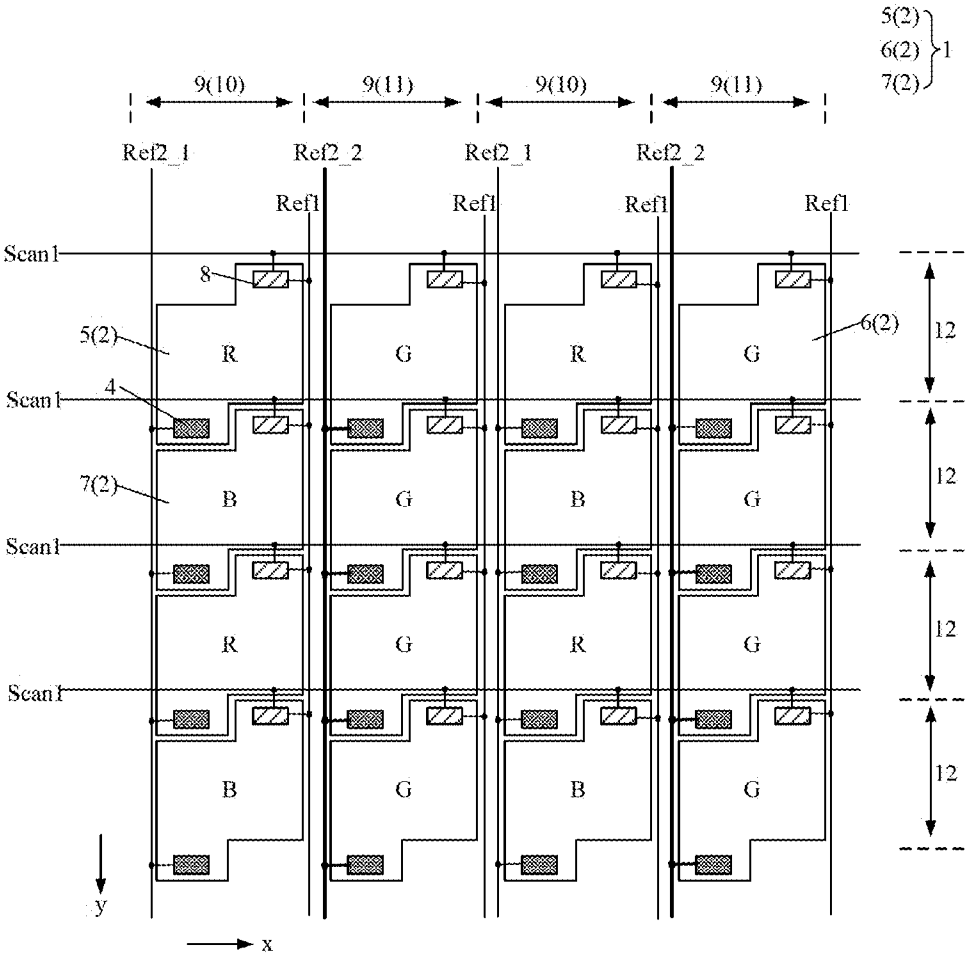
FIG. 11 is a partial diagram of a display panel according to some embodiments of the present disclosure.

FIG. 11 is a partial diagram of a display panel according to some embodiments of the present disclosure. In some embodiments of the present disclosure, as shown in FIG. 11, the display panel further includes gate reset lines Ref1, and the gate reset lines Ref1 are electrically connected to the gate reset circuits 8 in the sub-pixels 1 in the pixel columns 9.

As state above, if the gate reset lines Ref1 are designed to extend longitudinally along the second direction y, when a certain pixel row 12 is scanned by the first scan signal line Scan1, all sub-pixels 1 in this pixel row 12 receive gate reset voltages $V_{ref1}$ having a same transmitting distance on the gate reset lines Ref1. The gate reset voltages $V_{ref1}$ are transmitted from the bottom of the display region to this pixel row 12. As a result, the gate reset voltages $V_{ref1}$ received by different sub-pixels 1 in this pixel row 12 have the same voltage drop, improving the resetting uniformity of the driving transistors M0 in the sub-pixels 1. This arrangement further overcomes the non-uniform voltage drops of the gate reset voltages $V_{ref1}$ received by the sub-pixels 1 that are arranged laterally, and is more suitable to high pixel density display panels.

Figure 12:
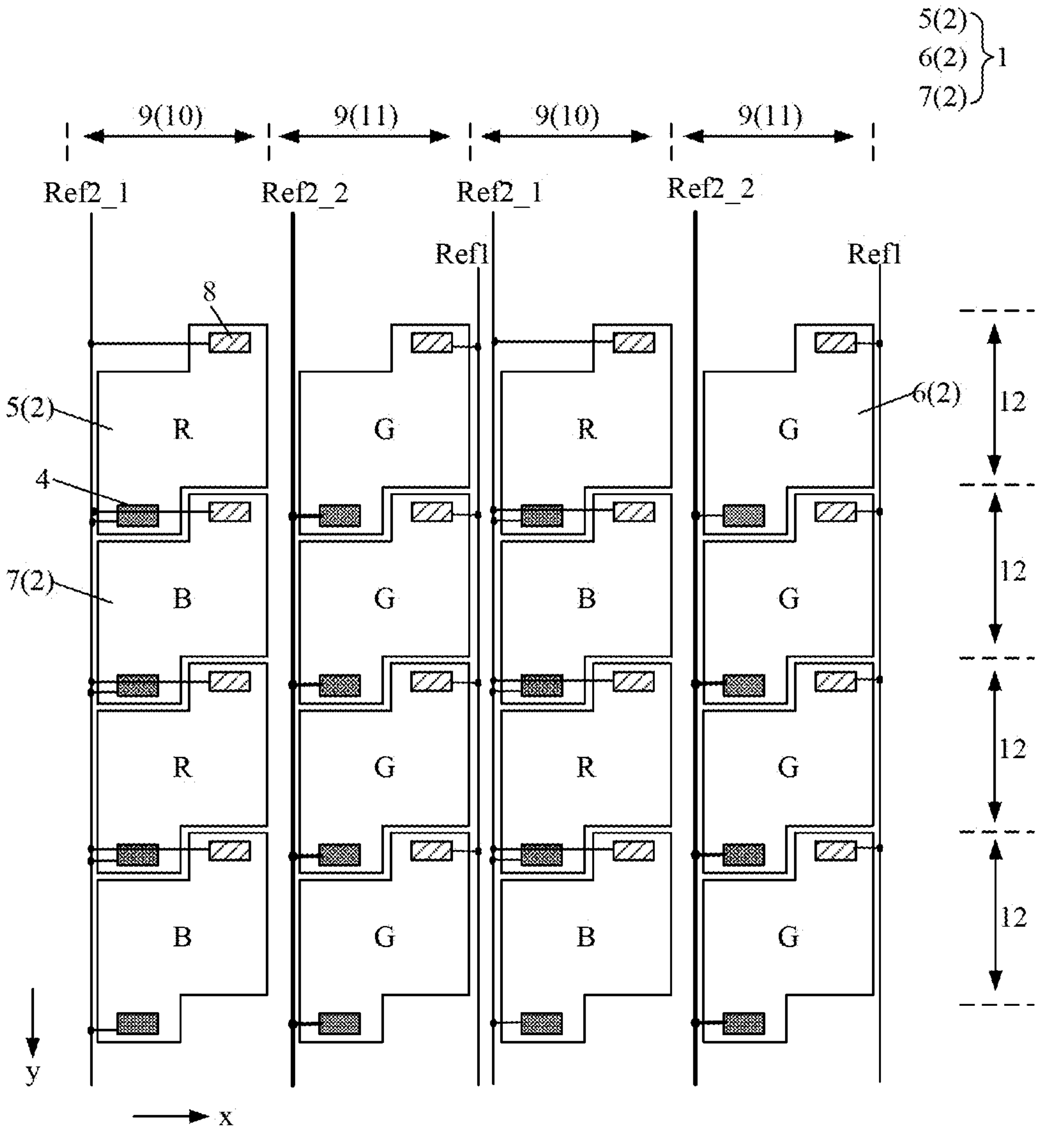
FIG. 12 is a partial diagram of a display panel according to some embodiments of the present disclosure.

FIG. 12 is a partial diagram of a display panel according to some embodiments of the present disclosure. In some embodiments of the present disclosure, as shown in FIG. 12, the gate reset line Ref1 extends longitudinally along the second direction y, the gate reset voltage $V_{ref1}$ is equal to the first anode reset voltage $V_{ref21}$, and the first anode reset line Ref2_1 is further connected to the gate reset circuits 8 in the pixel column 9 connected to the first anode reset line Ref2_1. This arrangement is more suitable for the configuration that the sub-pixels 1 are arranged in the first pixel columns 10 and second pixel columns 11. In this embodiment, the gate reset line Ref1 corresponding to the first pixel column 10 can be omitted, only the second pixel column 11 is provided with the gate reset line Ref1, which can greatly reduce the number of the gate reset lines Ref1.

Figure 13:
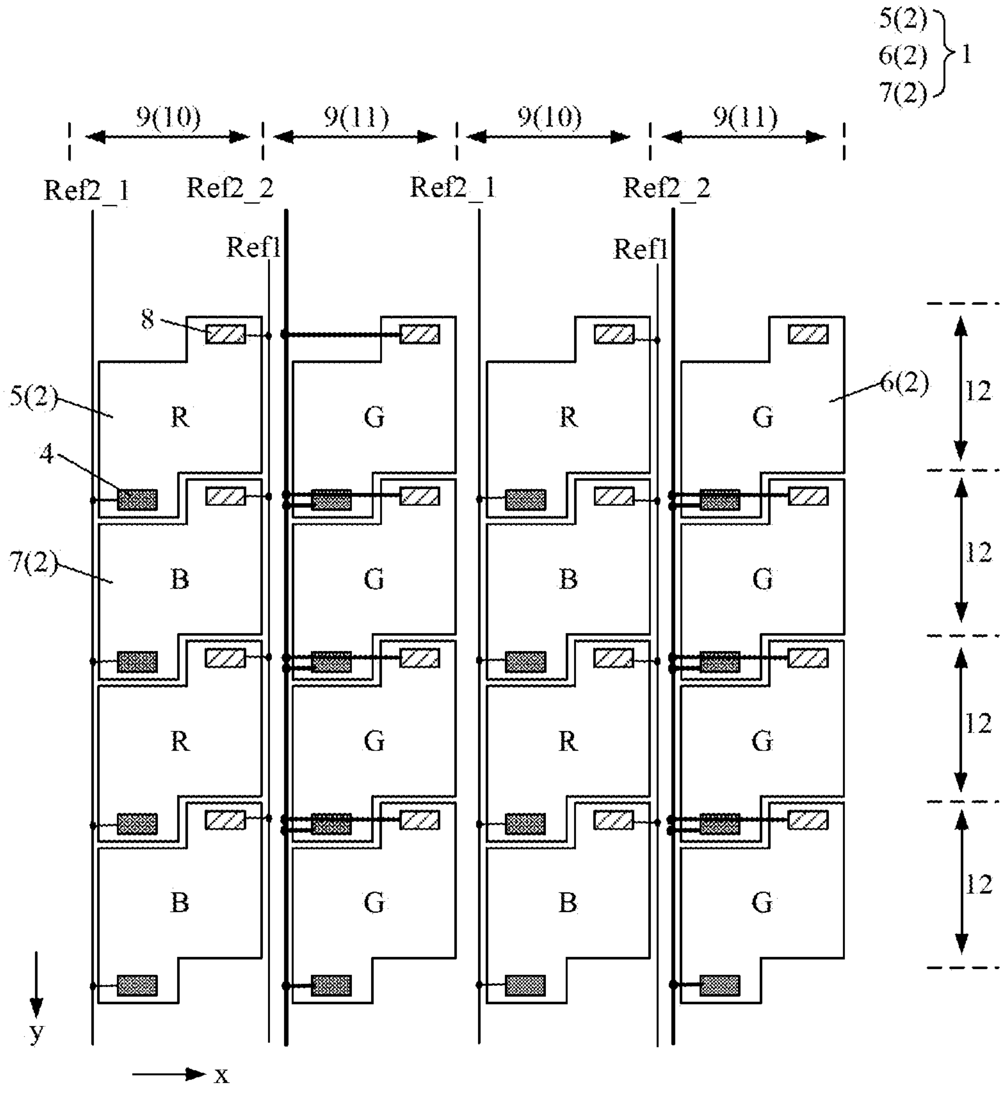
FIG. 13 is a partial diagram of a display panel according to some embodiments of the present disclosure.

FIG. 13 is a partial diagram of a display panel according to some embodiments of the present disclosure. In some embodiments of the present disclosure, as shown in FIG. 13, the gate reset voltage $V_{ref1}$ is equal to the second anode reset voltage $V_{ref22}$, the second anode reset line Ref2_2 is further connected to the gate reset circuits 8 in the pixel column 9 connected to the second anode reset line Ref2_2. This arrangement is more suitable for the configuration that the sub-pixels 1 are arranged in the first pixel columns 10 and second pixel columns 11. In this embodiment, the gate reset line Ref1 corresponding to the second pixel column 11 can be omitted, only the first pixel column 10 is provided with the gate reset line Ref1, which can greatly reduce the number of the gate reset lines Ref1.

Figure 14:
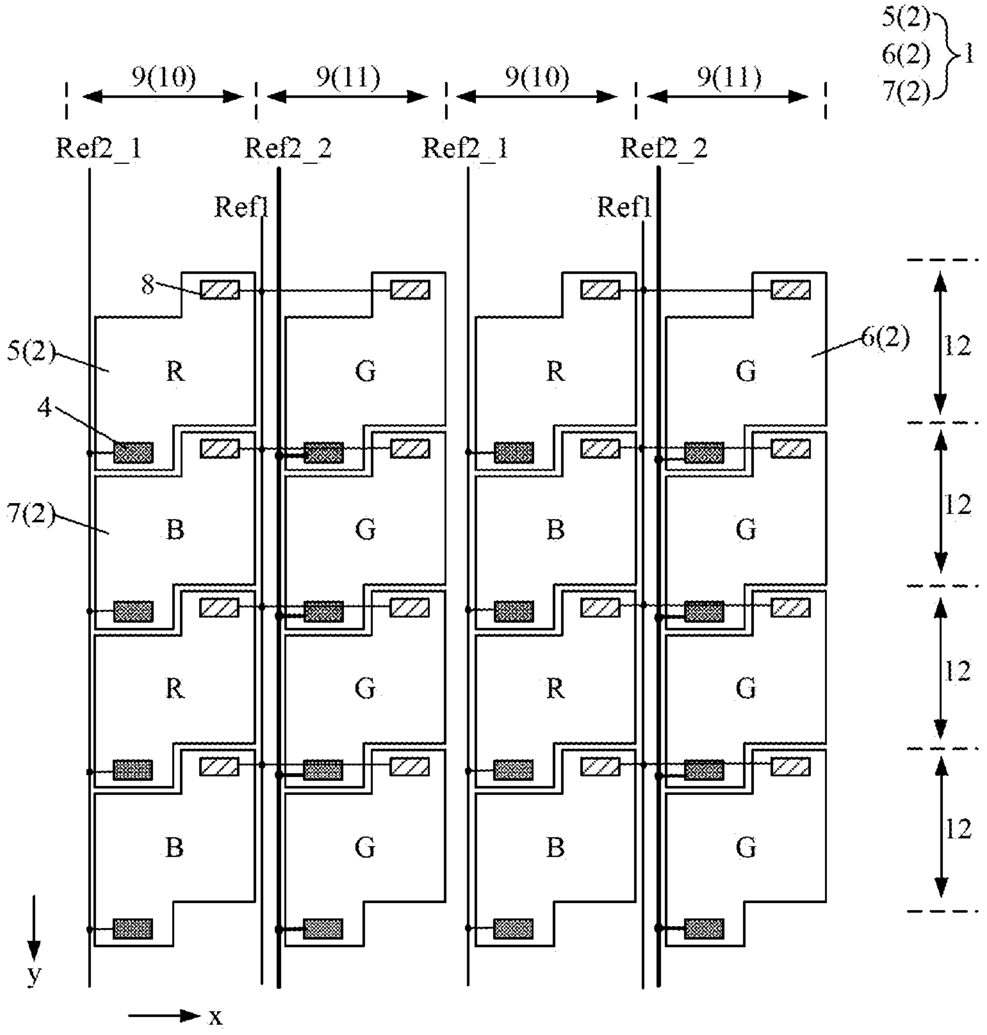
FIG. 14 is a partial diagram of a display panel according to some embodiments of the present disclosure.

FIG. 14 is a partial diagram of a display panel according to some embodiments of the present disclosure. In some embodiments of the present disclosure, as shown in FIG. 14, the gate reset line Ref1 extends longitudinally along the second direction y, and the gate reset line Ref1 is electrically connected to the gate reset circuits 8 in two adjacent pixel columns 9. In this case, every two adjacent pixel columns 9 are provided with one corresponding gate reset line Ref, which can reduce the number of the gate reset lines Ref1.

Figure 15:
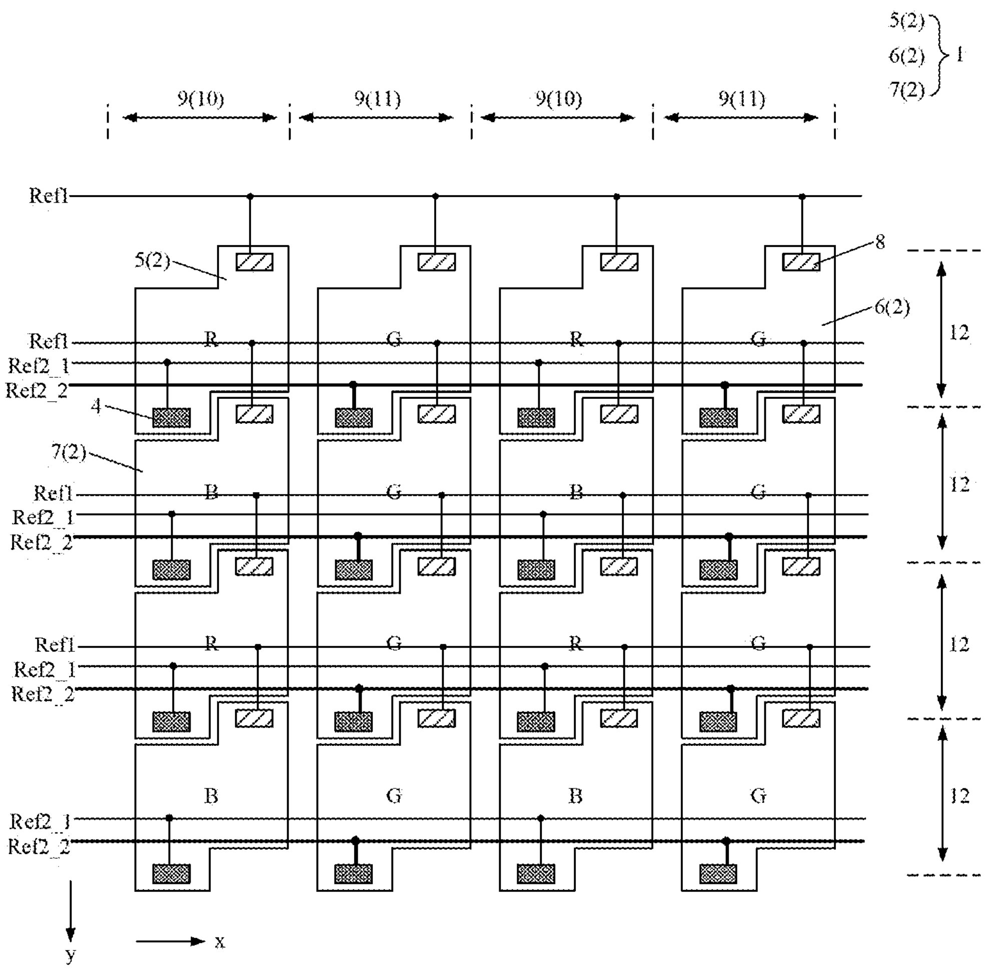
FIG. 15 is a partial diagram of a display panel according to some embodiments of the present disclosure.

FIG. 15 is a partial diagram of a display panel according to some embodiments of the present disclosure. In some embodiments of the present disclosure, as shown in FIG. 15, the display panel further includes multiple pixel rows 12 arranged along the second direction y, and the pixel row 12 includes multiple sub-pixels 1 arranged along the first direction x crossing the second direction y.

The display panel further includes first anode reset lines Ref2_1, second anode reset lines Ref2_2, and gate reset lines Ref1. The first anode reset line Ref2_1 extends along the first direction x and is electrically connected to the anode reset circuits 4 in first sub-pixels 1 in the corresponding pixel row 12. The second anode reset line Ref2_2 extends along the first direction x and is electrically connected to the anode reset circuits 4 in second sub-pixels 1 in the corresponding pixel row 12. The gate reset line Ref1 extends along the first direction x and is electrically connected to the gate reset circuits 8 in the sub-pixels 1 in the corresponding pixel row 12.

In the above arrangement, the first anode reset line Ref2_1, the second anode reset line Ref2_2 and the gate reset line Ref1 all extend laterally along the first direction x. The first anode reset line Ref2_1, the second anode reset line Ref2_2 and the gate reset line Ref1 are connected to the anode reset circuits 4 or the gate reset circuits 8 in the pixel row 12 in a simpler way, helping the optimizing of the layout design.

Figure 16:
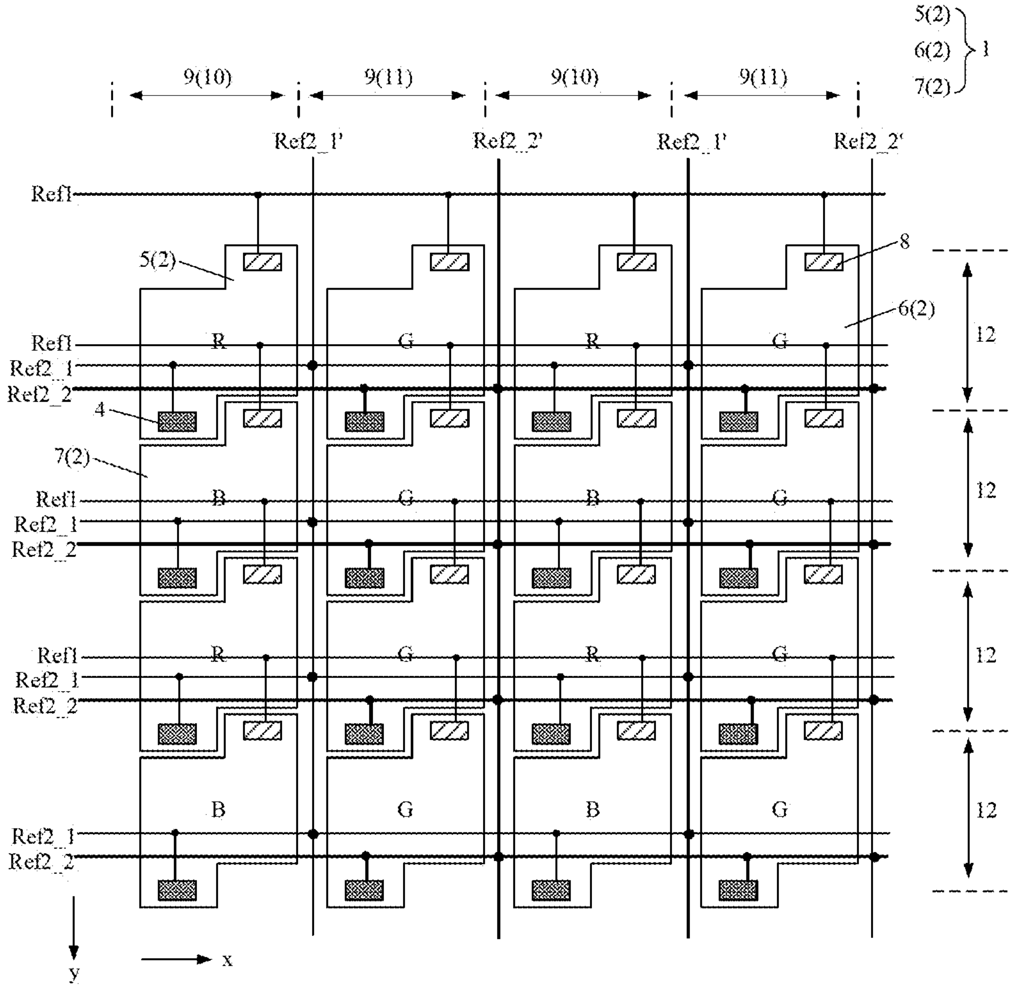
FIG. 16 is a partial diagram of a display panel according to some embodiments of the present disclosure.

FIG. 16 is a partial diagram of a display panel according to some embodiments of the present disclosure. In some embodiments of the present disclosure, as shown in FIG. 16, the display panel further includes first auxiliary anode reset lines Ref2_1' and second auxiliary anode reset lines Ref2_2'. The first auxiliary anode reset lines Ref2_1' extend along the second direction y. The first auxiliary anode reset lines Ref2_1' are electrically connected to the first anode reset lines Ref2_1 and form a grid structure with the first anode reset lines Ref2_1. In this way, the load of the overall wire constituted by the first auxiliary anode reset lines Ref2_1' and the first anode reset lines Ref2_1 is reduced, and the voltage drop of the first anode reset voltage $V_{ref21}$ during transmission is reduced. The second auxiliary anode reset lines Ref2_2' extend along the second direction y. The second auxiliary anode reset lines Ref2_2' are electrically connected to the second anode reset lines Ref2_2, and form a grid structure with the second anode reset lines Ref2_2. In this way, the load of the overall wire constituted by the second auxiliary anode reset lines Ref2_2' and the second anode reset lines Ref2_2 is reduced, and the voltage drop of the second anode reset voltage $V_{ref22}$ during transmission is reduced.

Figure 17:
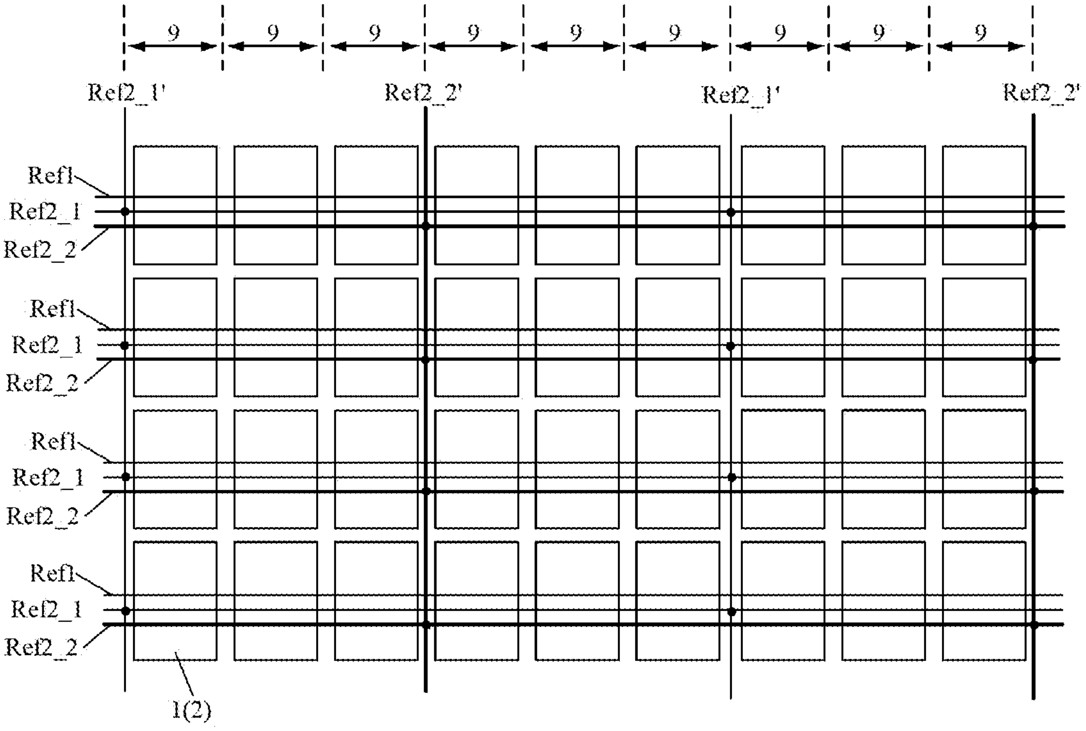
FIG. 17 is a partial diagram of a display panel according to some embodiments of the present disclosure.

FIG. 17 is a partial diagram of a display panel according to some embodiments of the present disclosure. In some embodiments of the present disclosure, as shown in FIG. 17, the display panel further includes pixel columns 9 arranged along the first direction x, and the pixel column 9 includes multiple sub-pixels 1 arranged along the second direction y. The first auxiliary anode reset lines Ref2_1' are arranged alternately with the second auxiliary anode reset lines Ref2_2'. The first auxiliary anode reset line Ref2_1' is spaced apart from the second auxiliary anode reset line Ref2_2' adjacent to the first auxiliary anode reset line by multiple pixel columns 9. For example, the first auxiliary anode reset line Ref2_1' is spaced apart from the adjacent second auxiliary anode reset line Ref2_2' by 2, 3, 4 or 6 pixel columns 9.

The first auxiliary anode reset line Ref2_1' is only used for reducing the voltage drop of the first anode reset voltage $V_{ref21}$ during transmission, and the second auxiliary anode reset line Ref2_2' is only used for reducing the voltage drop of the second anode reset voltage $V_{ref22}$ during transmission. Therefore, in the arrangement, the first auxiliary anode reset line Ref2_1' and the second auxiliary anode reset line Ref2_2' adjacent to the first auxiliary anode reset line Ref2_1' are spaced apart by pixel columns 9, reducing the number of the auxiliary anode reset lines required and optimizing the wire arrangement.

Figure 18:
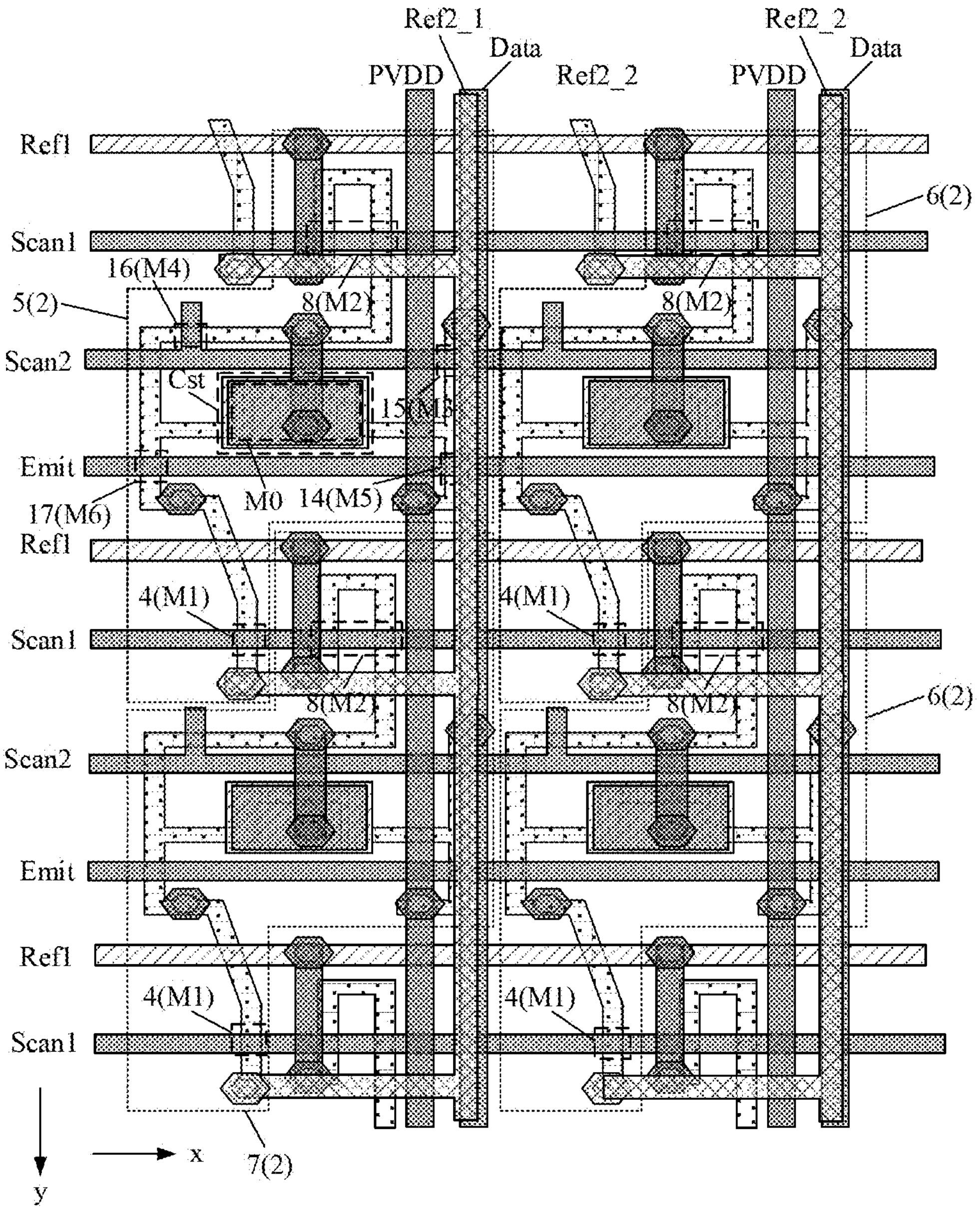
FIG. 18 is a partial diagram showing layers of a display panel according to some embodiments of the present disclosure.

FIG. 18 is a partial diagram showing layers of a display panel according to some embodiments of the present disclosure. In some embodiments of the present disclosure, as shown in FIG. 3 and FIG. 18, the pixel circuit 2 further includes a data writing circuit 15. The data writing circuit 15 is electrically connected to a data line Data and a first electrode of the driving transistor M0.

When the first anode reset line Ref2_1 and the second anode reset line Ref2_2 extend longitudinally along the second direction y, the first anode reset line Ref2_1 and the data line Data are arranged in different layers, and along the direction perpendicular to the plane of the display panel, the first anode reset line Ref2_1 at least partially overlaps the data line Data, and/or, the second anode reset line Ref2_2 and the data line Data are arranged in different layers, and along the direction perpendicular to the plane of the display panel, the second anode reset line Ref2_2 at least partially overlaps the data line Data. In this way, the effect of the first anode reset line Ref2_1 and the second anode reset line Ref2_2 on the transmittance of the display panel can be reduced, and the display panel is better applied in the transparent display. Moreover, with such arrangement, the longitudinal space occupied by the first anode reset line Ref2_1 and the second anode reset line Ref2_2 at least partially overlaps the data line Data, so that there is more space for arranging the sub-pixel 1, improving the pixel density of the display panel.

Figure 19:
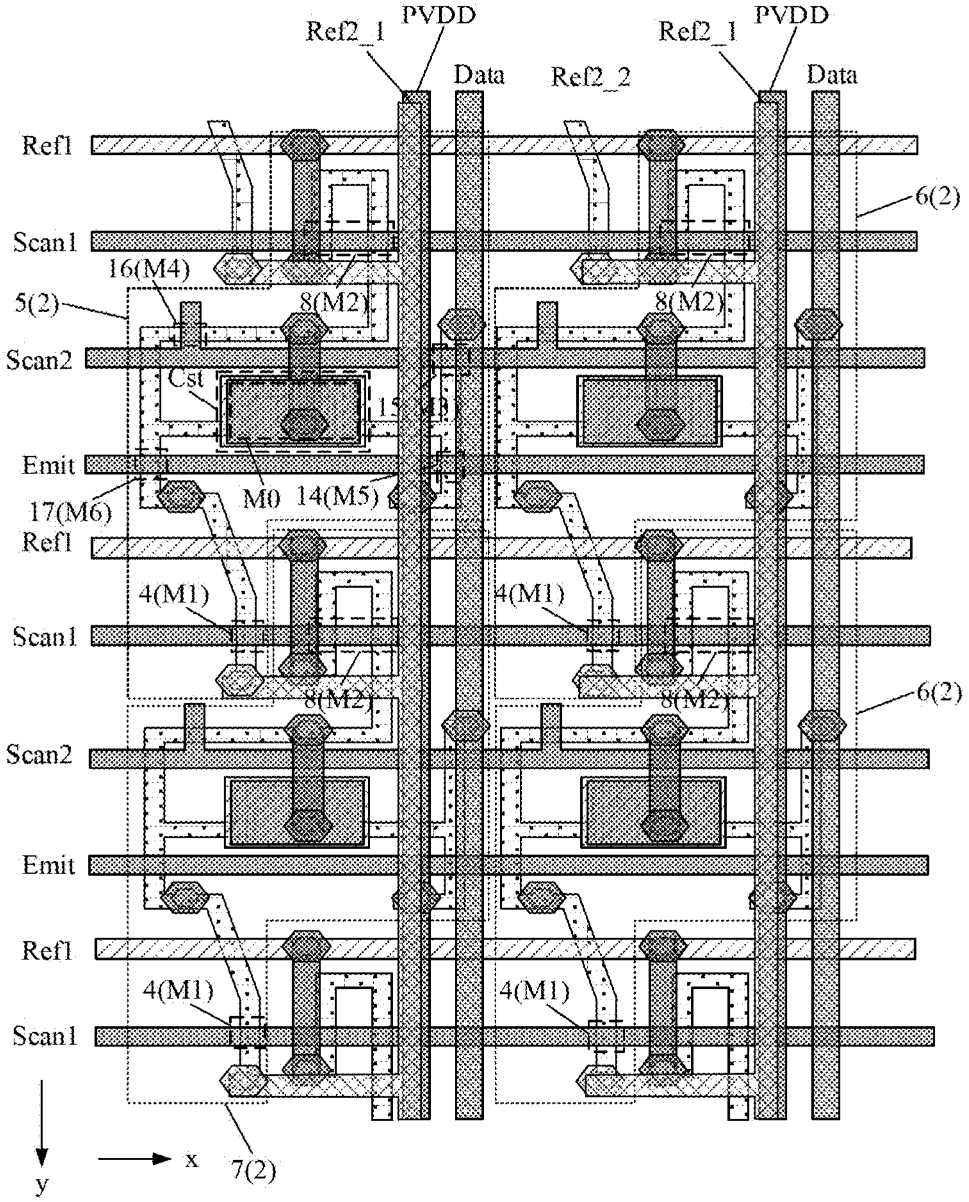
FIG. 19 is a partial diagram showing layers of a display panel according to some embodiments of the present disclosure.

FIG. 19 is a partial diagram showing layers of a display panel according to some embodiments of the present disclosure. In some embodiments of the present disclosure, as shown in FIG. 3 and FIG. 19, the pixel circuit 2 further includes a first light-emitting control circuit 14, and the first light-emitting control circuit 14 is connected to a power supply line PVDD and the first electrode of the driving transistor M0.

When the first anode reset line Ref2_1 and the second anode reset line Ref2_2 extend longitudinally along the second direction y, the first anode reset line Ref2_1 and the power supply line PVDD are arranged in different layers, and along the direction perpendicular to the plane of the display panel, the first anode reset line Ref2_1 at least partially overlaps the power supply line PVDD, and/or, the second anode reset line Ref2_2 and the power supply line PVDD are arranged in different layers, and along the direction perpendicular to the plane of the display panel, the second anode reset line Ref2_2 at least partially overlaps the power supply line PVDD. In this way, the effect of the first anode reset line Ref2_1 and the second anode reset line Ref2_2 on the transmittance of the display panel can be reduced, and the display panel is better applied in the transparent display. Moreover, with such arrangement, the longitudinal space occupied by the first anode reset line Ref2_1 and the second anode reset line Ref2_2 at least partially overlaps the power supply line PVDD, so that there is more space for arranging the sub-pixel 1, improving the pixel density of the display panel.

The operation principle of the pixel circuit 2 is described in the following embodiments with taking the structure of the pixel circuit 2 shown in FIG. 3 as an example.

As shown in FIG. 3, the pixel circuit 2 includes: a driving transistor M0, an anode reset circuit 4, a gate reset circuit 8, a data writing circuit 15, a compensation circuit 16, a first light-emitting control circuit 14, a second light-emitting control circuit 17, and a storage capacitor Cst.

The anode reset circuit 4 includes an anode reset transistor M1. A gate of the anode reset transistor M1 is electrically connected to a second scan signal line Scan2. A second electrode of the anode reset transistor M1 is electrically connected to an anode of the light-emitting element 3. The first electrodes of the anode reset transistors M1 in the red sub-pixel 5 and the blue sub-pixel 7 are electrically connected to the first anode reset line Ref2_1. The first electrode of the anode reset transistor M1 in the green sub-pixel 6 is electrically connected to the second anode reset line Ref2_2.

The gate reset circuit 8 includes a gate rest transistor M2. A gate of the gate reset transistor M2 is electrically connected to a first scan signal line Scan1. A first electrode of the gate reset transistor M2 is electrically connected to the gate reset line Ref1. A second electrode of the gate reset transistor M2 is electrically connected to the gate of the driving transistor M0.

The data writing circuit 15 includes a data writing transistor M3. A gate of the data writing transistor M3 is electrically connected to the second scan signal line Scan2. A first electrode of the data writing transistor M3 is electrically connected to a data line Data. A second electrode of the data writing transistor M3 is electrically connected to the first electrode of the driving transistor M0.

The compensation circuit 16 includes a compensation transistor M4. A gate of the compensation transistor M4 is electrically connected to the second scan signal line Scan2. A first electrode of the compensation transistor M4 is electrically connected to the second electrode of the driving transistor M0. A second electrode of the compensation transistor M4 is electrically connected to the gate of the driving transistor M0.

The first light-emitting control circuit 14 includes a first light-emitting control transistor M5. A gate of the first light-emitting control transistor M5 is electrically connected to a light-emitting control signal line Emit. A first electrode of the first light-emitting control transistor M5 is electrically connected to a power supply line PVDD. A second electrode of the first light-emitting control transistor M5 is electrically connected to the first electrode of the driving transistor M0.

The second light-emitting control circuit 17 includes a second light-emitting control transistor M6. A gate of the second light-emitting control transistor M6 is electrically connected to the light-emitting control signal line Emit. A first electrode of the second light-emitting control transistor M6 is electrically connected to the second electrode of the driving transistor M0. A second electrode of the second light-emitting control transistor M6 is electrically connected to the anode of the light-emitting element 3.

A first plate of the storage capacitor Cst is electrically connected to the power supply line PVDD, and a second plate of the storage capacitor Cst is electrically connected to the gate of the driving transistor M0.

Figure 20:
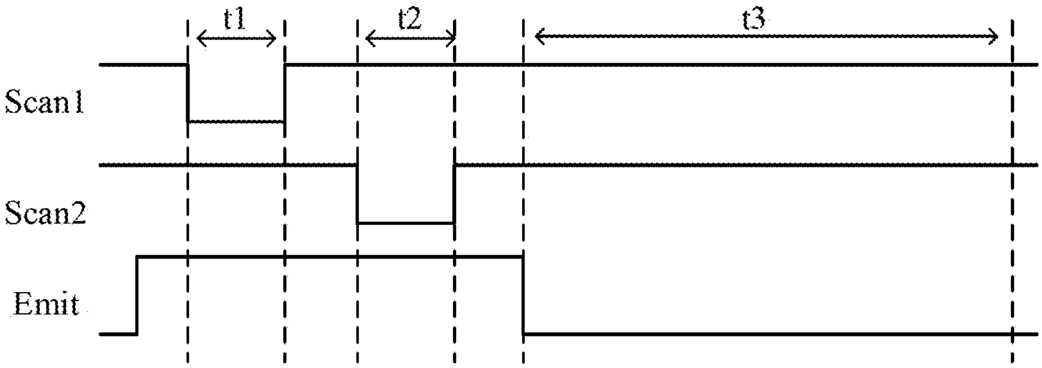
FIG. 20 is a timing diagram of a pixel circuit according to some embodiments of the present disclosure.

FIG. 20 is a timing diagram of a pixel circuit according to some embodiments of the present disclosure. Based on the above structure, as shown in FIG. 20, the operation process of the pixel circuit 2 can include a reset phase t1, a data writing phase t2, and a light-emitting control phase t3.

In the reset phase t1, the first scan signal line Scan1 supplies an enable level, the gate reset transistor M2 is turned on under the action of the enable level supplied by the first scan signal line Scan1 and supplies the gate reset voltage $V_{ref1}$ provided by the gate reset line Ref1 to the gate of the driving transistor M0.

In the data writing phase t2, the second scan signal line Scan2 supplies an enable level, and the data writing transistor M3 and the compensation transistor M4 are turned on by the enable level provided by the second scan signal line Scan2. A data voltage provided by the data line Data is inputted to the gate of the driving transistor M0 through the data writing transistor M3 and the compensation transistor M4, and the compensation of the driving transistor M0 is also achieved. In the red sub-pixel 5 and the blue sub-pixel 7, the anode reset transistor M1 is turned on by the enable level provided by the second scan signal line Scan2, and the first anode reset voltage $V_{ref21}$ provided by the first anode reset line Ref2_1 is inputted to the anode of the light-emitting element 3 that is connected to the anode reset transistor M1. In the green sub-pixel 6, the anode reset transistor M1 is turned on by the enable level provided by the second scan signal line Scan2, and the second anode reset voltage $V_{ref22}$ provided by the second anode reset line Ref2_2 is inputted to the anode of the light-emitting element 3 that is connected to the anode reset transistor M1.

In the light-emitting control phase t3, the light-emitting control signal line Emit supplies an enable level. The first light-emitting control transistor M5 and the second light-emitting control transistor M6 are turned on by the enable level provided by the light-emitting control signal line Emit, and the driving current generated by the driving transistor M0 is supplied to the anode of the light-emitting element 3.

In some embodiments of the present disclosure, the display panel can include a semiconductor layer, a first metal layer, a second metal layer, a third metal layer, a fourth metal layer, and a fifth metal layer that are stacked along a light-exiting direction of the display panel. For ease of understanding, different fill patterns shown in FIG. 8, FIG. 18 and FIG. 19 are used to illustrate different layers.

Active layers of the transistors can be located in the semiconductor layer. The first scan signal line Scan1, the second scan signal line Scan2, and the light-emitting control signal line Emit can be located in the first metal layer. The first plate of the storage capacitor Cst connected to the power supply line PVDD can be located in the second metal layer. In some embodiments of the present disclosure, the data line Data and the power supply line PVDD are located in the third metal layer. In some embodiments of the present disclosure, the power supply line PVDD is located in the third metal layer, and the data line Data is located in the fourth metal layer.

When the first anode reset line Ref2_1 and the second anode reset line Ref2_2 extend along the second direction y, the first anode reset line Ref2_1 and the second anode reset line Ref2_2 can be arranged in a layer different from the layer of the data line Data or the power supply line PVDD. For example, the first anode reset line Ref2_1 and the second anode reset line Ref2_2 are arranged in the fifth metal layer, and the first anode reset line Ref2_1 and the second anode reset line Ref2_2 overlap the data line Data or the power supply line PVDD.

In some embodiments of the present disclosure, a turn-on voltage of the light-emitting element 3 in the green sub-pixel 6 is smaller than turn-on voltages of the light-emitting elements 3 in the red sub-pixel 5 and the blue sub-pixel 7. In this way, the anode of the light-emitting element 3 in the green sub-pixel 6 is charged to the turn-on voltage in a shorter time, and the light-emitting element 3 in the green sub-pixel 6 emits light earlier, thereby further increasing the brightness of the green sub-pixel 6 in the first frame.

Embodiments of the present disclosure provide a method for driving a display panel. The method is used for driving the display panel in the above embodiments. The driving method includes: causing the anode reset circuits 4 in the red sub-pixel 5 and the blue sub-pixel 7 to reset the anodes of the light-emitting elements 3 in the red sub-pixel 5 and the blue sub-pixel 7 by using a first anode reset voltage $V_{ref21}$; and causing the anode reset circuit 4 of the green sub-pixel 6 to reset the anode of the light-emitting element 3 of the green sub-pixel 6 by using the second anode reset voltage $V_{ref22}$ that is greater than the first anode reset voltage $V_{ref21}$.

With reference to the above statements, the driving method can increase the anode reset voltage of the light-emitting element 3 in the green sub-pixel 6, and accordingly, the time for charging the anode of the light-emitting element 3 in the green sub-pixel 6 to the turn-on voltage is shortened. As a result, the light-emitting direction of the light-emitting element 3 in the green sub-pixel 6 is increased, the brightness of the green sub-pixel 6 in the first frame is effectively increased, the brightness proportion of the red sub-pixel 5, the green sub-pixel 6 and the blue sub-pixel 7 in the first frame is adjusted, and accordingly, the white balance of the first frame is achieved in the dark mode.

Figure 21:
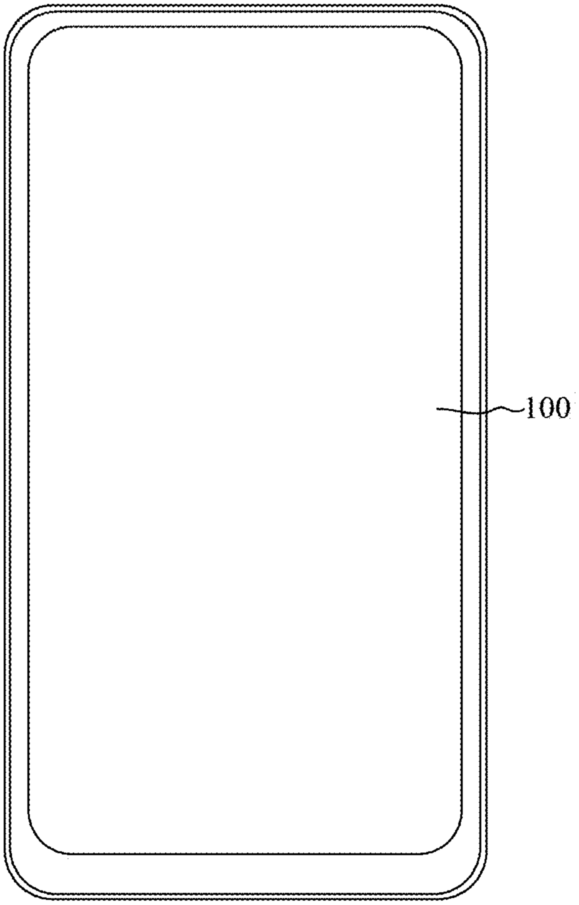
FIG. 21 is a structural schematic diagram of a display device according to some embodiments of the present disclosure.

Embodiments of the present disclosure further provide a display device. FIG. 21 is a structural schematic diagram of a display device according to some embodiments of the present disclosure. As shown in FIG. 21, the display device includes a display panel 100. The specific structure of the display panel 100 has been described in details in the above embodiments and is not repeated here. The display device shown in FIG. 21 is merely for illustration. The display device can be electronic devices with a display function, for example, a mobile phone, a tablet computer, a laptop computer, an electronic paper or a television.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A display panel, comprising:

a plurality of sub-pixels each comprising a pixel circuit and a light-emitting element, wherein the pixel circuit comprises an anode reset module;

wherein the plurality of sub-pixels comprises a red sub-pixel, a green sub-pixel, and a blue sub-pixel, wherein the anode reset module of the red sub-pixel is configured to reset an anode of the light-emitting element of the red sub-pixel by using a first anode reset voltage, wherein the anode reset module of the blue sub-pixel is configured to reset an anode of the light-emitting element of the blue sub-pixel by using the first anode reset voltage, wherein the anode reset module of the green sub-pixel is configured to reset an anode of the light-emitting element of the green sub-pixel by using a second anode reset voltage; and wherein the pixel circuit further comprises a driving transistor and a plurality of gate reset circuits, wherein the plurality of gate reset circuits correspond to each pixel of the plurality of sub-pixels, wherein gate reset circuits of the red sub-pixel, the green sub-pixel, and the blue sub-pixel are configured to respectively reset gates of the drive transistors of the red sub-pixel, the green sub-pixel, and the blue sub-pixel by using a same gate reset voltage.

2. The display panel according to claim 1, wherein the gate reset voltage is equal to the first anode reset voltage or the second anode reset voltage.

3. The display panel according to claim 1, wherein the gate reset voltage is not equal to either the first anode reset voltage or the second anode reset voltage.

4. The display panel according to claim 3, wherein the gate reset voltage is smaller than the first anode reset voltage.

5. The display panel according to claim 1, further comprising:

pixel columns arranged along a first direction wherein the pixel columns comprise two or more sub-pixels of the plurality of sub-pixels arranged along a second direction, wherein the first direction crosses the second direction;

first anode reset lines extending along the second direction and electrically connected to the anode reset modules of the red sub-pixel and the blue sub-pixel of a pixel column of the pixel columns; and second anode reset lines extending along the second direction and electrically connected to the anode reset module of the green sub-pixel of a pixel column of the pixel columns.

6. The display panel according to claim 5, wherein the pixel columns comprise first pixel columns and second pixel columns that are alternately arranged along the first direction, wherein at least one of the first pixel columns comprises red sub-pixels and blue sub-pixels that are alternately arranged along the second direction, and wherein at least one of the second pixel column comprises green sub-pixels arranged along the second direction, and wherein at least one of the first anode reset lines corresponds to one first pixel column of the first pixel columns and is electrically connected to the anode reset modules of the one first pixel column, and at least one of the second anode reset line corresponds to one second pixel column of the second pixel columns and is electrically connected to the anode reset modules of the one second pixel column.

7. The display panel according to claim 5, further comprising:

pixel rows arranged along the second direction and comprising two or more sub-pixels of the plurality of sub-pixels arranged along the first direction; and gate reset lines extending along the first direction, wherein one gate reset line of the gate reset lines is electrically connected to the gate reset circuits of the sub-pixels in one pixel row of the pixel rows.

8. The display panel according to claim 7, wherein the gate reset voltage is equal to the first anode reset voltage, and wherein the gate reset lines are electrically connected to the first anode reset lines, respectively, or wherein the gate reset voltage is equal to the second anode reset voltage, and wherein the gate reset lines are electrically connected to the second anode reset lines, respectively.

9. The display panel according to claim 5, further comprising:

gate reset lines extending along the second direction and electrically connected to the gate reset circuits of the sub-pixels in the pixel columns, respectively.

10. The display panel according to claim 9, wherein the gate reset voltage is equal to the first anode reset voltage, and the first anode reset lines are electrically connected to the gate reset circuits in the pixel column that is connected to the first anode reset line, respectively, or wherein the gate reset voltage is equal to the second anode reset voltage, and the second anode reset lines are electrically connected to the gate reset circuits in the pixel column that is connected to the first anode reset line, respectively.

11. The display panel according to claim 9, wherein one gate reset line of the gate reset lines is electrically connected to the gate reset circuits in two adjacent pixel columns of the pixel columns.

12. The display panel according to claim 1, further comprising:

pixel rows arranged along a second direction and comprising two or more sub-pixels of the plurality of sub-pixels arranged along a first direction, wherein the second direction crosses the first direction;

first anode reset lines extending along the first direction and electrically connected to anode reset modules in first sub-pixels in a pixel row of the pixel rows, respectively;

second anode reset lines extending along the first direction and electrically connected to anode reset modules in second sub-pixels in a pixel row of the pixel rows, respectively; and gate reset lines extending along the first direction and electrically connected to the gate reset circuits in the sub-pixels in a pixel row of the pixel rows, respectively.

13. The display panel according to claim 12, further comprising:

first auxiliary anode reset lines extending along the second direction and electrically connected to the first anode reset lines, respectively; and second auxiliary anode reset lines extending along the second direction and electrically connected to the second anode reset lines, respectively.

14. The display panel according to claim 13, further comprising:

pixel columns arranged along the first direction and comprising two or more sub-pixels of the plurality of sub-pixels arranged along the second direction, wherein the first auxiliary anode reset lines are arranged alternately with the second auxiliary anode reset lines, and a first auxiliary anode reset line of the first auxiliary anode reset lines is spaced apart from a second auxiliary anode reset line of the second auxiliary anode reset lines that is adjacent to the first auxiliary anode reset line by two or more of the pixel columns.

15. The display panel according to claim 5, wherein the pixel circuit further comprises a data writing circuit electrically connected to a data line and a first electrode of the driving transistor, wherein the first anode reset line and the data line are arranged in different layers of the display panel, and along a direction perpendicular to a plane of the display panel, the first anode reset line at least partially overlaps the data line, or wherein the second anode reset line and the data line are arranged in different layers of the display panel, and along the direction perpendicular to the plane of the display panel, the second anode reset line at least partially overlaps the data line.

16. The display panel according to claim 5, wherein the pixel circuit further comprises a first light-emitting control circuit electrically connected to a power supply line and a first electrode of the driving transistor, wherein the first anode reset line and the power supply line are arranged in different layers of the display panel, and, along a direction perpendicular to a plane of the display panel, the first anode reset line at least partially overlaps the power supply line, or wherein the second anode reset line and the power supply line are arranged in different layers of the display panel, and, along the direction perpendicular to the plane of the display panel, the second anode reset line at least partially overlaps the power supply line.

17. The display panel according to claim 1, wherein a turn-on voltage of the light-emitting element in the green sub-pixel is smaller than turn-on voltages of the light-emitting elements in the red sub-pixel and the blue sub-pixel.

18. A method for driving a display panel, wherein the display panel comprises a plurality of sub-pixels each comprising a pixel circuit and a light-emitting element, wherein the pixel circuit comprises an anode reset module, wherein the plurality of sub-pixels comprises a red sub-pixel, a green sub-pixel, and a blue sub-pixel, the anode reset module of the red sub-pixel is configured to reset an anode of the light-emitting element of the red sub-pixel by using a first anode reset voltage, the anode reset module of the blue sub-pixel is configured to reset an anode of the light-emitting element of the blue sub-pixel by using the first anode reset voltage, and the anode reset module of the green sub-pixel is configured to reset an anode of the light-emitting element of the green sub-pixel by using a second anode reset voltage, and wherein the pixel circuit further comprises a driving transistor and a plurality of gate reset circuits, wherein the plurality of gate reset circuits correspond to each pixel of the plurality of sub-pixels, wherein gate reset circuits of the first-color sub-pixel, the second-color sub-pixel, and the third-color sub-pixel are configured to respectively reset gates of the drive transistors of the first-color sub-pixel, the second-color sub-pixel, and the third-color sub-pixel by using a same gate reset voltage, the method comprising:

controlling the anode reset modules in the red sub-pixel and the blue sub-pixel to reset the anodes of the light-emitting elements in the red sub-pixel and the blue sub-pixel by using a first anode reset voltage; and controlling the anode reset module of the green sub-pixel to reset the anode of the light-emitting element of the green sub-pixel by using the second anode reset voltage greater than the first anode reset voltage.

19. A display device comprising a display panel, wherein the display panel comprises:

a plurality of sub-pixels each comprising a pixel circuit and a light-emitting element, wherein the pixel circuit comprises an anode reset module;

wherein the plurality of sub-pixels comprises a red sub-pixel, a green sub-pixel, and a blue sub-pixel, an anode reset module of the red sub-pixel is configured to reset an anode of the light-emitting element of the red sub-pixel by using a first anode reset voltage, an anode reset module of the blue sub-pixel is configured to reset an anode of the light-emitting element of the blue sub-pixel by using the first anode reset voltage, and an anode reset module of the green sub-pixel is configured to reset an anode of the light-emitting element of the green sub-pixel by using a second anode reset voltage; and wherein the pixel circuit further comprises a driving transistor and a plurality of gate reset circuits, wherein the plurality of gate reset circuits correspond to each pixel of the plurality of sub-pixels, wherein gate reset circuits of the first-color sub-pixel, the second-color sub-pixel, and the third-color sub-pixel are configured to respectively reset gates of the drive transistors of the first-color sub-pixel, the second-color sub-pixel, and the third-color sub-pixel by using a same gate reset voltage.

20. A display panel, comprising:

a plurality of sub-pixels each comprising a pixel circuit and a light-emitting element, wherein the pixel circuit comprises an anode reset module;

wherein the plurality of sub-pixels comprises a first-color sub-pixel, a second-color sub-pixel, and a third-color sub-pixel, wherein the first anode reset module is configured to reset an anode of the light-emitting element of the first-color sub-pixel by using a first anode reset voltage, wherein the third anode reset module is configured to reset an anode of the light-emitting element of the third-color sub-pixel by using the first anode reset voltage, wherein the second anode reset module is configured to reset an anode of the light-emitting element of the second-color sub-pixel by using a second anode reset voltage; and the pixel circuit further comprises a driving transistor and a plurality of gate reset circuits, wherein the plurality of gate reset circuits correspond to each pixel of the plurality of sub-pixels, wherein gate reset circuits of the first-color sub-pixel, the second-color sub-pixel, and the third-color sub-pixel are configured to respectively reset gates of the drive transistors of the first-color sub-pixel, the second-color sub-pixel, and the third-color sub-pixel by using a same gate reset voltage.

21. The display panel according to claim 20, wherein the gate reset voltage is equal to the first anode reset voltage or the second anode reset voltage.

22. The display panel according to claim 20, wherein the gate reset voltage is not equal to either the first anode reset voltage or the second anode reset voltage.

23. The display panel according to claim 22, wherein the gate reset voltage is smaller than the first anode reset voltage.

24. The display panel according to claim 20, further comprising:

pixel columns arranged along a first direction wherein the pixel columns comprise two or more sub-pixels of the plurality of sub-pixels arranged along a second direction, wherein the first direction crosses the second direction;

first anode reset lines extending along the second direction and electrically connected to the anode reset modules of the first-color sub-pixel and the third-color sub-pixel of a pixel column of the pixel columns; and second anode reset lines extending along the second direction and electrically connected to the anode reset module of the second-color sub-pixel of a pixel column of the pixel columns.

25. The display panel according to claim 24, wherein the pixel columns comprise first pixel columns and second pixel columns that are alternately arranged along the first direction, wherein at least one of the first pixel columns comprises first-color sub-pixels and third-color sub-pixels that are alternately arranged along the second direction, and wherein at least one of the second pixel column comprises second-color sub-pixels arranged along the second direction, and wherein at least one of the first anode reset lines corresponds to one first pixel column of the first pixel columns and is electrically connected to the anode reset modules of the one first pixel column, and at least one of the second anode reset line corresponds to one second pixel column of the second pixel columns and is electrically connected to the anode reset modules of the one second pixel column.

26. The display panel according to claim 24, further comprising:

pixel rows arranged along the second direction and comprising two or more sub-pixels of the plurality of sub-pixels arranged along the first direction; and gate reset lines extending along the first direction, wherein one gate reset line of the gate reset lines is electrically connected to the gate reset circuits of the sub-pixels in one pixel row of the pixel rows.

27. The display panel according to claim 26, wherein the gate reset voltage is equal to the first anode reset voltage, and wherein the gate reset lines are electrically connected to the first anode reset lines, respectively, or wherein the gate reset voltage is equal to the second anode reset voltage, and wherein the gate reset lines are electrically connected to the second anode reset lines, respectively.

28. The display panel according to claim 24, further comprising:

gate reset lines extending along the second direction and electrically connected to the gate reset circuits of the sub-pixels in the pixel columns, respectively.

29. The display panel according to claim 28, wherein the gate reset voltage is equal to the first anode reset voltage, and the first anode reset lines are electrically connected to the gate reset circuits in the pixel column that is connected to the first anode reset line, respectively, or wherein the gate reset voltage is equal to the second anode reset voltage, and the second anode reset lines are electrically connected to the gate reset circuits in the pixel column that is connected to the first anode reset line, respectively.

30. The display panel according to claim 28, wherein one gate reset line of the gate reset lines is electrically connected to the gate reset circuits in two adjacent pixel columns of the pixel columns.

31. The display panel according to claim 20, further comprising:

pixel rows arranged along a second direction and comprising two or more sub-pixels of the plurality of sub-pixels arranged along a first direction, wherein the second direction crosses the first direction;

first anode reset lines extending along the first direction and electrically connected to anode reset modules in first sub-pixels in a pixel row of the pixel rows, respectively;

second anode reset lines extending along the first direction and electrically connected to anode reset modules in second sub-pixels in a pixel row of the pixel rows, respectively; and gate reset lines extending along the first direction and electrically connected to the gate reset circuits in the sub-pixels in a pixel row of the pixel rows, respectively.

32. The display panel according to claim 31, further comprising:

first auxiliary anode reset lines extending along the second direction and electrically connected to the first anode reset lines, respectively; and second auxiliary anode reset lines extending along the second direction and electrically connected to the second anode reset lines, respectively.

33. The display panel according to claim 32, further comprising:

pixel columns arranged along the first direction and comprising two or more sub-pixels of the plurality of sub-pixels arranged along the second direction, wherein the first auxiliary anode reset lines are arranged alternately with the second auxiliary anode reset lines, and a first auxiliary anode reset line of the first auxiliary anode reset lines is spaced apart from a second auxiliary anode reset line of the second auxiliary anode reset lines that is adjacent to the first auxiliary anode reset line by two or more of the pixel columns.

34. The display panel according to claim 24, wherein the pixel circuit further comprises a data writing circuit electrically connected to a data line and a first electrode of the driving transistor, wherein the first anode reset line and the data line are arranged in different layers of the display panel, and along a direction perpendicular to a plane of the display panel, the first anode reset line at least partially overlaps the data line, or wherein the second anode reset line and the data line are arranged in different layers of the display panel, and along the direction perpendicular to the plane of the display panel, the second anode reset line at least partially overlaps the data line.

35. The display panel according to claim 24, wherein the pixel circuit further comprises a first light-emitting control circuit electrically connected to a power supply line and a first electrode of the driving transistor, wherein the first anode reset line and the power supply line are arranged in different layers of the display panel, and, along a direction perpendicular to a plane of the display panel, the first anode reset line at least partially overlaps the power supply line, or wherein the second anode reset line and the power supply line are arranged in different layers of the display panel, and, along the direction perpendicular to the plane of the display panel, the second anode reset line at least partially overlaps the power supply line.

36. The display panel according to claim 20, wherein a turn-on voltage of the light-emitting element in the second-color sub-pixel is smaller than turn-on voltages of the light-emitting elements in the first-color sub-pixel and the third-color sub-pixel.

37. The display panel according to claim 20, further comprising:

first anode reset lines configured to provide the first anode reset voltage;

second anode reset lines configured to provide the second anode reset voltage, and gate reset line configured to provide the gate reset voltage.

38. The display panel according to claim 37, wherein at least part of the gate reset lines extend in a same direction as the first anode reset lines and/or the second anode reset lines, and the gate reset lines are disposed adjacent to the first anode reset lines and/or the second anode reset lines, the gate reset lines and the first anode reset lines or the second anode reset lines provide signals of different rows and/or columns.

39. The display panel according to claim 37, wherein the gate reset lines and the first anode reset lines or the second anode reset lines provide signals of adjacent rows and/or columns.

40. The display panel according to claim 37, wherein when the gate reset lines are disposed adjacent to the first anode reset lines and the second anode reset lines, the first anode reset lines and the second anode reset lines are located on a same side of the gate reset lines.

* * * * *